United States Patent [19]
Galuga et al.

[11] Patent Number: 6,035,243
[45] Date of Patent: Mar. 7, 2000

[54] SYSTEM FOR HANDLING DEFECTS PRODUCED DURING THE AUTOMATED ASSEMBLY OF PALLETIZED ELEMENTS

[75] Inventors: Marta A. Galuga; Jay A. Glaspy, Jr., both of Rochester, N.Y.

[73] Assignee: Xerox Corporation, Stamford, Conn.

[21] Appl. No.: 08/139,664

[22] Filed: Oct. 22, 1993

[51] Int. Cl.[7] .................................................. G06F 19/00
[52] U.S. Cl. ............................ 700/110; 700/96; 700/245
[58] Field of Search .......................... 29/428–431, 563, 29/564, 568, 564.1; 700/95, 96, 108–117, 213, 217, 245, 247, 257

[56] References Cited

U.S. PATENT DOCUMENTS

| | | | |
|---|---|---|---|
| 4,521,807 | 6/1985 | Werson | 358/106 |
| 4,541,011 | 9/1985 | Mayer et al. | 358/106 |
| 4,591,991 | 5/1986 | Sticht | 364/478 |
| 4,787,143 | 11/1988 | Yagi et al. | 29/833 |
| 4,916,286 | 4/1990 | Sarugaku et al. | 219/124.34 |
| 4,929,845 | 5/1990 | Amir et al. | 250/561 |
| 4,973,852 | 11/1990 | Denkevitz | 250/561 |
| 5,126,932 | 6/1992 | Wolfson et al. | 364/468 |
| 5,325,582 | 7/1994 | Glaser et al. | 364/468 |
| 5,341,304 | 8/1994 | Sakamoto et al. | 364/478 |
| 5,434,790 | 7/1995 | Saka et al. | 364/468 |

OTHER PUBLICATIONS

"Automatic Correction of Robot Displacement Errors"; Glaspy Jr., et al., Xerox Disclosure Journal, vol. 17, No. 5, Sep./Oct. 1992, pp. 303–304.

*Primary Examiner*—William Grant
*Assistant Examiner*—Steven R. Garland
*Attorney, Agent, or Firm*—Mark Costello; Andrew D. Ryan

[57] ABSTRACT

The present invention is a method and apparatus for utilizing the characteristics of a pallet, or tray, used to supply workpieces to an automated, flexible assembly station or workcell. Once the characteristics are described and stored in memory, they may be used to uniquely identify workpieces which are determined to be defective during the automatic assembly operations. The defect information may then be stored in a cell controller which controls one or more workcells for later recall, in order to determine what, if any, further processing should be conducted on the defective workpieces and to prevent further processing thereof.

21 Claims, 11 Drawing Sheets

SYSTEM FOR HANDLING DEFECTS PRODUCED DURING THE AUTOMATED ASSEMBLY OF PALLETIZED ELEMENTS

CROSS REFERENCE

The following related application is hereby incorporated by reference for its teachings:

"Menu Driven System for Controlling Automated Assembly of Palletized Elements," Glaspy et al., Ser. No. 08/139,657 now U.S. Pat. No. 5,475,797, filed concurrently herewith.

This invention relates generally to a method and apparatus for process control of robots within a flexible assembly system (FAS), and more particularly to the handling of error or defect information generated during the assembly of workpieces in such a system.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

BACKGROUND AND SUMMARY OF THE INVENTION

Short-run production is increasingly utilized in today's competitive manufacturing environments. In order to meet such demands, many dedicated assembly lines are being replaced with flexible systems which enable rapid changeover of the line, thereby increasing the efficiency of production. Unfortunately, the industrial workcells, which typically employ programmable robots, have become extremely complex and the difficulty in modifying the operations of such workcells has resulted in rather inflexible assembly lines.

Flexible assembly is the ability of an automated or robot system to assemble different parts into different assembled units. For example, at the beginning of the workday a robot may be configured to place and secure circuit boards into the chassis of personal computers. After completing a desired quantity of assemblies the robot may be instructed to assemble components for a paper path in a xerographic copier. Although the materials and tools are different, the work processes share similarities that can be modeled such that a unified architecture can be developed to satisfy all types of flexible robot assembly applications.

The present invention is directed toward alleviating one of three types of data flow and control problems which arise within such a flexible assembly system, including: 1) encoding the location of workpieces used by robots in the workcell; 2) collecting and processing error data during production; and 3) providing flexibility in the control of operations within the system.

The first problem is resolved using a method and apparatus for defining the position of workpieces held on pallets used within a flexible assembly system. The pallet configuration capability of the present invention captures the geometrical configuration of workpieces on any type of pallet (i.e., a universal pallet) and translates the configuration into a data record which the robot understands.

The second problem area is alleviated using a method which encodes process error data transmitted between the components of the flexible assembly system. This encoded or "encapsulated" error data, is subsequently used to identify substandard workpieces to a particular position on the pallet. The use of the encapsulated error data further enables efficient pallet routing decisions to be executed within the FAS cell. Ultimately, the proposed system improves the quality of the end items or assemblies produced therein.

The last problem in the flexible assembly system is resolved using a method which provides the user the choice of running a workcell either locally (one of the robot stations), or at a remote source (a remotely located computer). Control capability from a remote system, a cell controller, is incorporated into the architecture, because of the advantages remote control provides. Remote control of cell operations correctly implies that multiple workcells containing multiple robots can be effectively controlled from a single location on the production floor. This in turn implies that fewer operators would be required to oversee a greater number of production operations, thereby further improving productivity.

The use of robots for the assembly of workpieces arranged in predefined locations is known, and control of the robots by a microcontroller which executes commands entered via a proprietary software language is also known. For example, Adept robots (Adept Technology, Incorporated, San Jose, Calif.) utilize the V+ language to create Pascal-like data records to define system characteristics. Robotic systems have commonly been employed in "dedicated" or highly repetitive operations that remain constant over long runs on an assembly line. As a result, the need for flexibility in the system, including the ease of modifying the robot operations or other system characteristics, was not a priority in such systems. Hence, alteration of the operation of the systems usually requires knowledge of the proprietary robot language and system characteristics in order to effect the desired changes or, in other words, a person having a high level of technical training is needed to effect alterations in the robot's process.

Heretofore, many such "dedicated" assembly systems have been developed to fabricate and inspect mechanical and electrical assemblies, of which the following disclosures may be relevant:

U.S. Pat. No. 4,521,807 Patentee: Werson Issued: Jun. 4, 1985

U.S. Pat. No. 4,541,011 Patentee: Mayer et al. Issued: Sep. 10, 1985

U.S. Pat. No. 4,787,143 Patentee: Yagi et al. Issued: Nov. 29, 1988

U.S. Pat. No. 4,916,286 Patentee: Sarugaku et al. Issued: Apr. 10, 1990

U.S. Pat. No. 4,929,845 Patentee: Amir et al. Issued: May 29, 1990

U.S. Pat. No. 4,973,852 Patentee: Denkevitz Issued: Nov. 27, 1990

Xerox Disclosure Journal "Automatic Correction of Robot Displacement Errors" September/October 1992, Vol. 17, No. 5

The foregoing patents and publication are hereby incorporated by reference for their teachings, and relevant portions thereof may be briefly summarized as follows:

U.S. Pat. No. 4,521,807 discloses an optical inspection system for the inspection of circular workpieces which includes an electronic camera having an optical system for focussing an image of a circular workpiece on an electronically active image receiving surface, and means to move the workpiece into a predetermined position in the field of view of the optical system. Difficulties encountered when inspecting a circular workpiece are overcome by scanning an image receiving surface in directions extending radially across the image receiving surface to produce an output signal. A signal analyzer is arranged to monitor the output signal corresponding to each radial scan to detect the presence of any irregularity in the workpiece.

U.S. Pat. No. 4,541,011 discloses a system for determining and recording the position, shape, size and depth of a defect in a billet or similar workpiece. The workpiece is displayed on the screen of a video display device, and the positions of the defects displayed on the screen are recorded in response to being manually selected by an operator. In addition, the patent further discloses that position indications from sensors are applied to a processor which correlates these indications with the position of the defect on the screen to determine the position of the defect on the workpiece.

U.S. Pat. No. 4,787,143 teaches a method and apparatus for detecting and enabling correction of a failure in the mounting of electronic parts on substrates. Moreover, automatic detection of failure in the mounting, and classification between failed substrates and acceptable substrates, improves the operating efficiency of an electronic parts mounting line. The method adapted applies a code mark to each substrate on which electronic parts are to be mounted, detects a mounting failure, reads and stores the code mark and failure data, and separates the failed substrates from acceptable substrates based upon the code mark and stored failure data.

U.S. Pat. No. 4,916,286 teaches a method and apparatus for controlling work performed by an automatic work processing machine whereby a just finished work undergoes an imaging operation by the use of an imaging apparatus. The outputs from the imaging apparatus are converted into binary values to obtain a line image which is then analyzed to evaluate the finished work by comparing the binary values to reference values. If the finished work is not satisfactory, evidenced by a deviation between the binary values and the reference values, the deviation is supplied to a control system which automatically changes some of the working parameters to attain a work of satisfactory quality.

U.S. Pat. No. 4,929,845 describes a method and apparatus for the inspection of circuit boards to detect missing and misaligned active and passive surface-mounted components on the circuit board. First the board is illuminated with a top light to enhance the image of the passive components. Next the circuit board is displaced, relative to a camera linescan trained on the board, so that the camera captures the image of successive strips of surface area across the board, perpendicular to its direction of movement. The images generated are subsequently stored and thereafter processed to determine if any components are misaligned or missing.

U.S. Pat. No. 4,973,852 discloses an apparatus which enables a user to identify an empty location of component parts on a printed circuit board or other type of component assembly, where the presence, absence, orientation or polarity of components is identified. Identification is described as being accomplished by utilizing a pattern of marks, such as dots, which are located in such a manner so as to be totally or partially obscured when the component is placed in the correct location. The marks may subsequently be used in a number of ways, including providing the identification of any location not occupied by the intended component, and indicating the polarity or orientation of a component.

A *Xerox Disclosure Journal* publication entitled "Automatic Correction of Robot Displacement Errors", published in the September/October 1992 issue (Vol. 17, No. 5), hereby incorporated by reference, teaches a method for automatically correcting displacement errors in robotic systems for part locations accessed by robot arms on assembly trays. The difference between the true location of a part and the location moved to by the robot relative to a given frame defines a displacement error.

In the previously described automated assembly systems, the flexibility of the system is characterized by its ability to prepare a robot with the parts, tools, and process steps necessary to accomplish the required tasks with little delay or downtime. Hence, the requirements of a flexible robot assembly system include:

(1) the ability to move parts and assembly tools into and out of the robot's workspace in an efficient and timely manner;

(2) the ability to inform the robot which application program to use when assembling the parts presented to it; and (3) the ability to inform and recover from exceptional conditions, or errors, which occur during an assembly process. To meet these requirements, the flexible assembly system which incorporates the present invention includes an architecture which implements robot control in a manner that maximizes flexibility. The system also hides the details of the architecture and programming languages from the end-user responsible for characterizing or altering the geometric configurations of parts presented to the system. Lastly, the system includes the capability to efficiently handle process errors detected during assembly so as to reduce or eliminate defects.

In accordance with the present invention, there is provided a system for automatically performing operations on workpieces located on a pallet, comprising: a workcell for performing operations to modify a workpiece present on the pallet; a cell controller in communication with said workcell, for controlling the operation of said workcell in response to a set of preprogrammed requirements; means, located at said workcell, for detecting a defect in the assembly of the workpiece and generating an error message indicative of the defect; and means for communicating the error message to said cell controller, so that said cell controller may initiate an appropriate response.

In accordance with another aspect of the present invention, in a flexible, workpiece assembly system having a workcell which includes a robot controller and a robot, responsive to the robot controller, for assembling the workpieces, there is provided a method of controlling the system comprising the steps of: defining locations for a plurality of workpieces on a pallet presented to the workcell; in response to a set of preprogrammed requirements provided to a cell controller, communicating from the cell controller to the workcell a plurality of commands for controlling the operation of the workcell so as to assemble the workpieces on the pallet; detecting, at the workcell, a defect during the assembly of a workpiece and generating an error message indicative of the defect; and communicating the error message to the cell controller.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
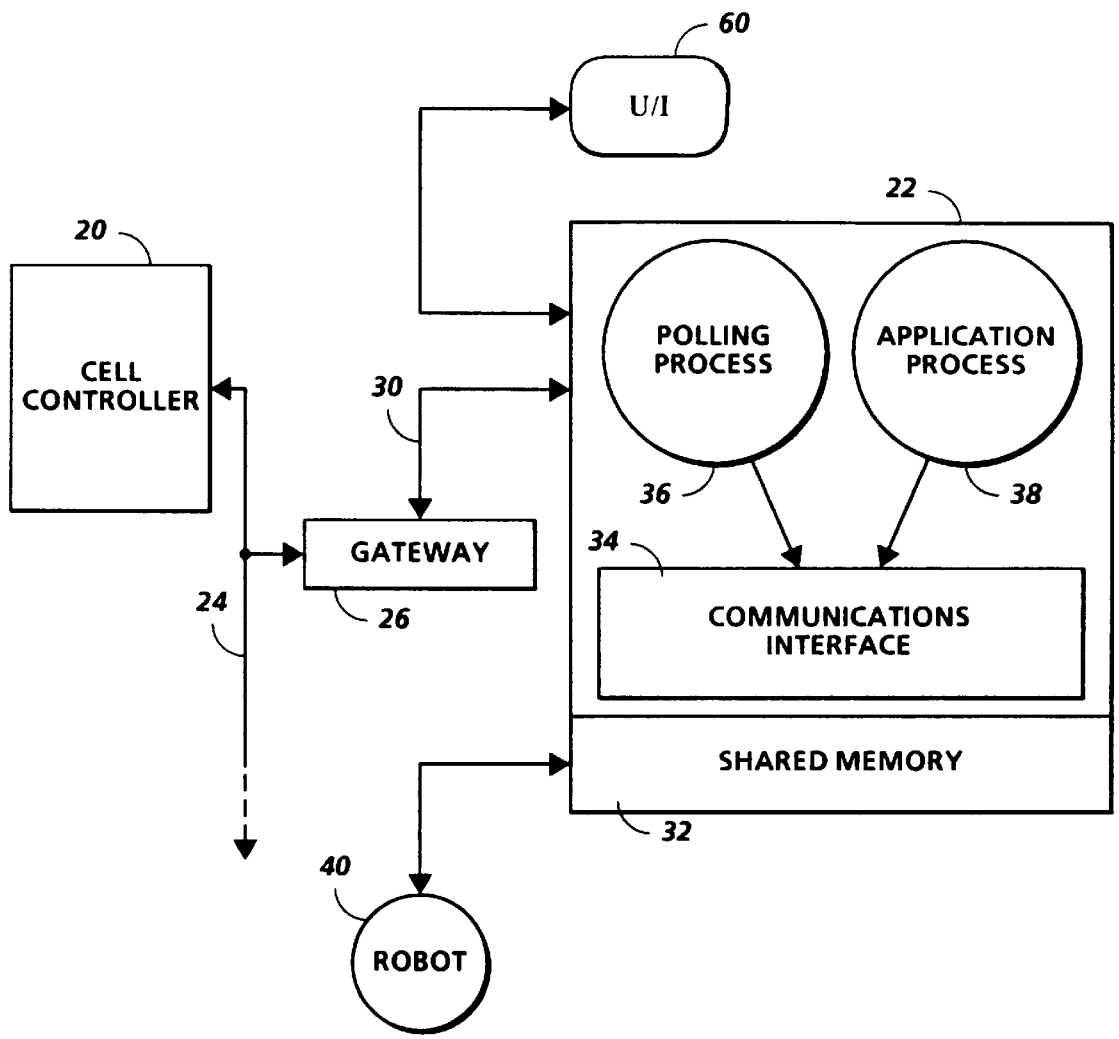
FIG. 1 is a schematic illustration of the principle components of a flexible assembly system which employs the present invention.
Figure 3:
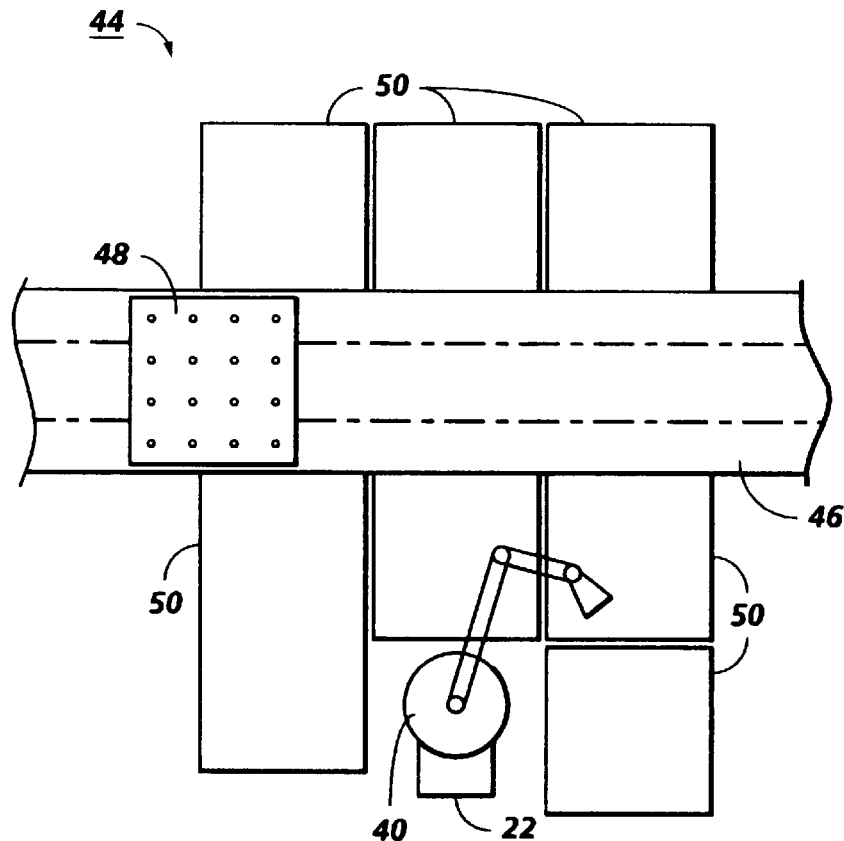
FIG. 3 illustrates the physical layout of a single robot assembly cell in the flexible assembly system which incorporates the present invention.

For a general understanding of the operation of the present invention, reference is made to the drawings. In the drawings, like reference numerals have been used throughout to designate identical elements. As illustrated in FIGS. 1 and 3, the Flexible Assembly System (FAS) which embodies the present invention comprises the following systems:

(1) conveyor systems to route parts on pallets to and from robot workstations;

(2) high speed data networks for controlling robots from a central intelligence controller; and (3) piece-part inspection systems to allow for feedback on part locations and defects.

Figure 2:
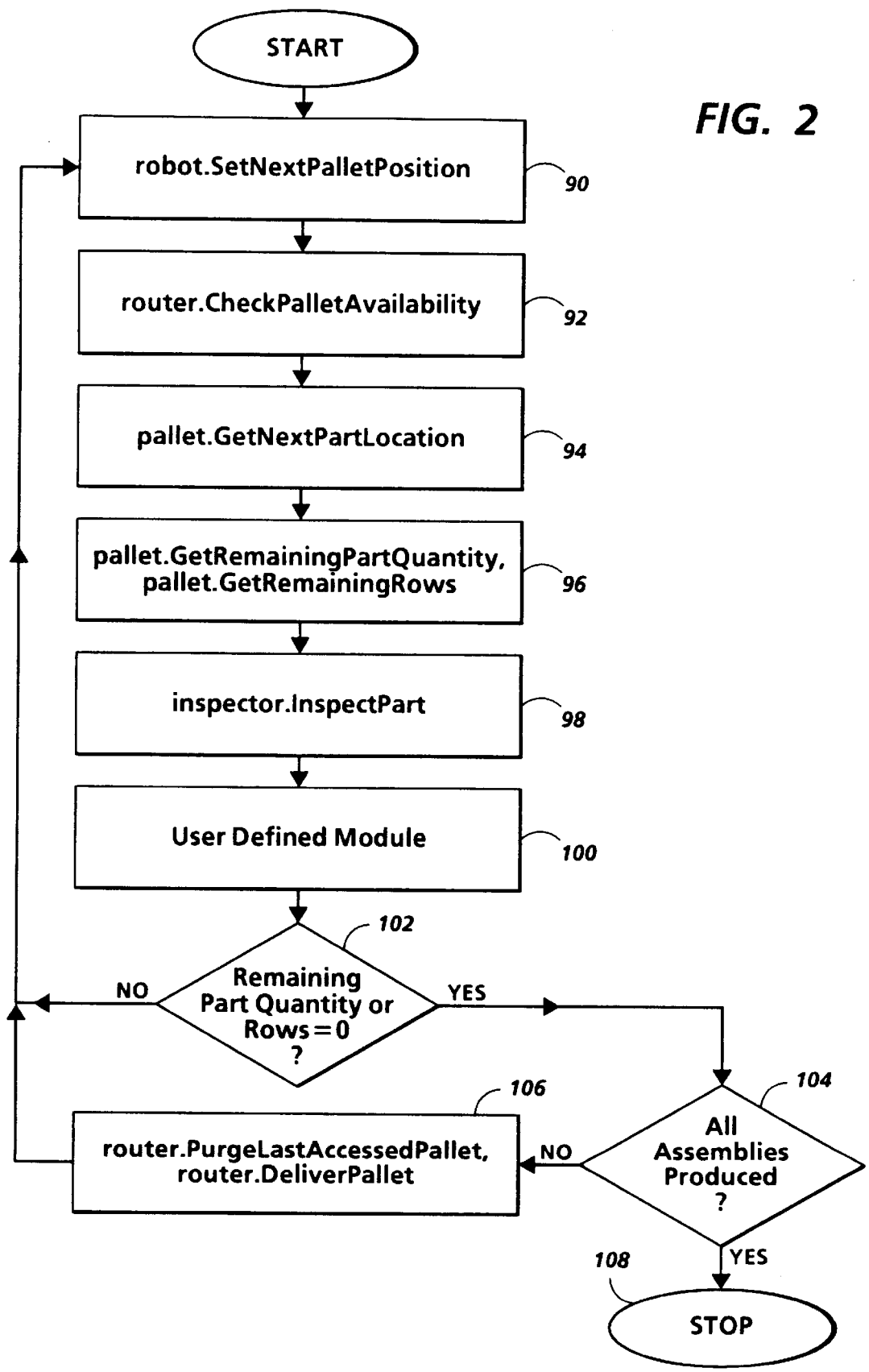
FIG. 2 is a flowchart depicting an example of the operations which might be executed by the various "objects" on a flexible assembly system.

Generally, application programs such as the one depicted by the flowchart of FIG. 2 define the steps a robot must take in order to assemble parts which are presented to it. These application programs utilize the systems listed above to complete the required assembly operation. Although the actual assembly process can be radically different between different programs, the application programs all share similar problems such as obtaining parts, releasing assembled units, communication to a centralized controller, error recovery, etc. The following description of a FAS embodiment includes an architecture that solves common control and data flow problems of such flexible assembly systems.

The flexible assembly system can be characterized as a set of objects. Generally, an object is an abstraction of a set of real world "things" that have the same characteristics. As an example, a robot is a real world thing. Robots have common characteristics regardless of their make or model. For instance, robot manipulators have speed constraints, maintain a run-time state, maintain a current location, have serial numbers, model and manufacturer names, etc. The specific values of these characteristics is what identifies a unique robot. Thinking of a robot as a simple object with characteristics, or attributes, makes it possible to define a system architecture that works for all such objects.

The FAS architecture defines several objects: a robot, a pallet, a pallet router, an assembly part, and a part inspector. An Adept robot and Texas Instrument robot are instances of the robot object. A xerographic paper path, an integrated circuit chip, and a car door are instances of assembly parts. Not only do object instances have similar types of attributes, they also have similar operations (methods) that can be performed on them. For example, all robots need to respond to a HALT command from the operator, and pallet objects should be able to maintain a state variable and provide state information to whomever or whatever requests such information. Using the familiar concept of data encapsulation, the only way to modify an object's attributes is through the object's methods. For example, to modify the speed attribute of a robot object the robot.SetSpeed( ) method must be invoked, and to determine the next available part on a pallet object the pallet.GetNextOperatingPosition( ) must to be invoked. The flexible assembly architecture provides application process flow and system object definitions (classes in object oriented terminology) that may be used by any assembly system that can be modeled by the defined objects. The process flow for a generalized assembly operation is illustrated in FIG. 2. Definitions of some of the objects included in the present embodiment are as follows:

ROBOT—a software driven manipulator arm that may be fitted with various tools on its "hand" to pick up, place down, and perform other types of manipulations on ASSEMBLY PARTS (see definition below).

Attributes:
Speed, CurrentOperatingPalletLocation, CurrentOperatingPalletArea, NumberOfUnitsToBuild, NumberOfUnitsCompleted, NumberOfFailedUnits, CurrentState.

Methods (operations that the ROBOT objects must perform):
Initialize, ExecuteProgram, Halt, SetSpeed, Pause, Resume,
StopAfterCurrentAssembly, GetState, GetCurrentLocation,
SetNextPalletPosition.

PALLET—a container that holds ASSEMBLY PARTS, arranged in such a way as can be described to the ROBOT for manipulation.

Attributes:
NumberOfAreas, NumberOfTiers, FrameErrorCorrectionFactor,
ArrayOfAreas, CurrentOperatingArea, (each area has the following
attributes:) NumberOfParts, NameOfPart, NumberOfRows,
NumberOfColumns, DistanceBetweenRows, DistanceBetweenColumns, TierOffset, CurrentState, CurrentOperatingRow, CurrentOperatingColumn, CurrentOperatingPartsAcquired, ReferenceLocation.

Methods:
ResetCurrentOperatingRow, ResetCurrentOperatingColumn,
GetAreaAttribute, Get/Set:CurrentOperatingArea, GetAllOffSets,
GetPartName, Initialize, GetCurrentOperatingPosition, GetNextOperatingPosition, GetNextPartLocation, GetRemainingPartQuantity, GetRemainingRows.

ROUTER—A module (comprised of software and/or hardware) which is responsible for the scheduling of ROBOT work and movement of pallets into and out of a ROBOT's local workspace.

Attributes:
NumberOfRobotsInSystem,
NumberOfPalletPositionsInRobotWorkSpace,
CurrentlyActiveRobots,
ArrayOfPalletLocations.
Methods:
PurgePallet, DeliverPallet, ReRoutePallet, ScheduleWork,
HandleError, CheckPalletAvailability.

ASSEMBLY PART—one or more pieces of material that can be combined with other pieces of material using a ROBOT in order to construct a single assembled unit.
Attributes:
PartName, PartManufacturer, PartSerialNumber, CurrentState (good, defective).
Methods:
SetPartState.

PART INSPECTOR—an external device that is used to inspect the presence or possibly the appearance of assembly parts on pallets.
Attributes:
CurrentState (on, off).
Methods:
InspectPart, ChangeState.

FIG. 1, an illustration of the principle components of the flexible assembly system, shows the communications link between cell controller 20 and robot controller 22. In the present embodiment, the cell controller and the robot controller function in concert to perform the operations of the ROUTER as described above. Cell controller 20 is preferably a microcomputer having at least one microprocessor, a storage memory, preferably a random access memory and/or permanent storage medium such as a hard disk. Robot controller 22 is preferably an Adept Robot Controller capable of hosting at least a second generation programming language, and allowing for integration with other equipment. Preferably the robot controller should also include memory and a high speed processing capability, so as to prevent a slowdown of the system while waiting for responses from the robot controller.

Cell controller 20 communicates to robot controller 22 via a BitBus Network, 24, (Intel® Corporation) or any similar network capable of sustaining a communication rate of about 375 KBaud. However, because individual robot systems are unable to communicate at such a high rate, particularly the Adept robot systems in the present embodiment, gateway 26 is used to receive the commands intended for the robot controller and convert them to a lower communication rate of about 19.2 KBaud. More specifically, gateway 26 is a communications device that receives the messages on the network 24 and converts them to be transferred, via RS-232 line 30, to robot controller 22.

Within robot controller 22 there are resident software programs which carry out the operations necessary to control and monitor a robot connected thereto, see reference numeral 40 in FIG. 1. As illustrated in FIG. 1, the robot controller includes both shared memory 32 and communications interface 34 through which both an application process and message polling process transfer command and status information. For example, the polling process polls the RS-232 serial channel for messages from the cell controller. The received messages, or commands, are passed to the application process and executed. Once completed, the application process responds and the message is again passed to the polling operation which in turn transmits it, via the gateway, back to the cell controller.

Communications Interface 34 provides reliable inter-process communication of cell controller commands and data for the robot controller 22. Communication amongst various application processes running on the robot controller is accomplished via shared memory 32 which contains global control variables. During operation of the robot controller, the polling process either reads from or writes to the global control variables, depending on the type of message or command received from the cell controller. Moreover, to prevent conflicts during access of the global variables contained in the shared memory, communications interface 34 arbitrates the access to the shared memory, thereby "hiding" the global variables from direct access by the processes running on the robot controller. Shared memory 32 is preferably a random access memory (RAM), but could also be any permanent storage device, such as a hard disk, which allows the random access of data stored thereon.

Turning now to FIG. 2, the flowchart depicts the normal operation of the FAS, where the methods defined for each object are utilized within a typical application program. For instance, router methods and robot methods running within the applications process 38 of FIG. 1 use a communication interface 34 to communicate with a remote cell controller 20. Furthermore, a pallet object is initialized with data established by a pallet configuration utility, and router methods utilize process error data communicated by the robots.

Beginning with step 90 in FIG. 2, an application program would instruct the robot object to execute the SetNextPalletPosition method. The SetNextPalletPosition operation would then identify the position 50 of the pallet holding parts to be assembled. Next, the router object is instructed to execute the method CheckPalletAvailability, step 92, to determine if a pallet is located at the position returned by step 90. Subsequently, in steps 94 and 96, a number of calls are made to the pallet objects to sequentially determine the location of the next assembly part on the pallet (GetNextPartLocation), determine the number of parts that remain to be assembled, and the number of rows remaining on the pallet in the position returned by step 90. Once the preliminary steps are completed, an optional inspection step 98 may be performed to assure that one or more of the assembly components are satisfactory.

Having satisfactorily determined that the materials are available to complete an assembly, the User Defined Module, represented by step 100, is executed. This is the user programmable portion of the application program, where robot and pallet methods may be accessed to manipulate or produce the current assembly. Generally, the operations will either perform some operation on the assembly part or will move the part to be assembled with another part. All the operations to be executed in this step are controlled by applications level "calls" to the various objects, specifying methods or operations which the objects are to perform.

Once the User Defined Module is completed, test step 102 determines if either the remaining part quantity or a row variable have reached zero. The first indicating that no further parts are available to be processed, while the latter indicates that a pallet has been completed. A negative response to both will result in a restarting of the application process flow at step 90. An affirmative response will move the application program to test step 104, where a determination is made whether further parts are to be processed. If a sufficient number of assemblies have been produced, the step will produce an affirmative response and the application flow will stop, step 108. Otherwise, the application continues at step 106, where the router object is instructed to carry out the operations PurgeLastAccessedPallet and DeliverPallet. These two operations will serve to remove the completed pallet and to replace it with a new pallet. Although the application program flow diagram illustrates a sequential process, the reliance upon individual objects to accomplish the identified tasks increases the flexibility of the User Defined Module significantly over commonly available systems.

Figure 4:
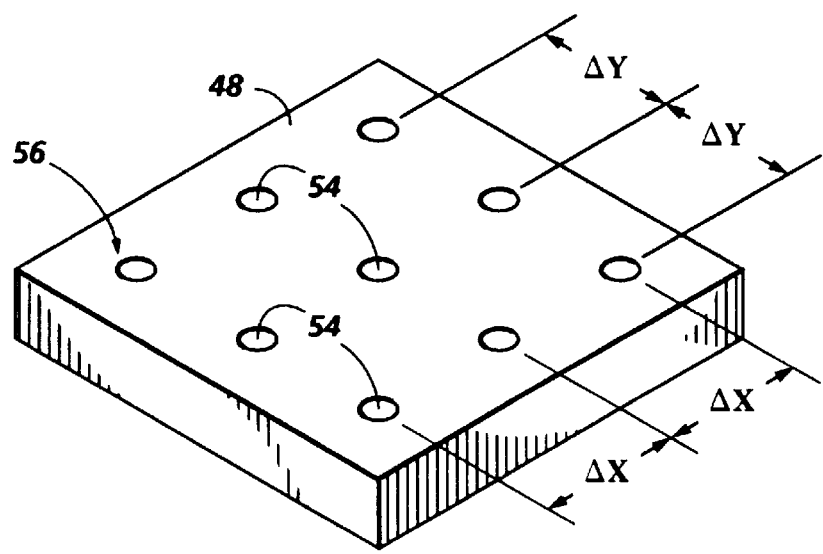
FIGS. 4 and 5 illustrate some alternative pallet geometries which could be used in the workcell of FIG. 3.
Figure 5:
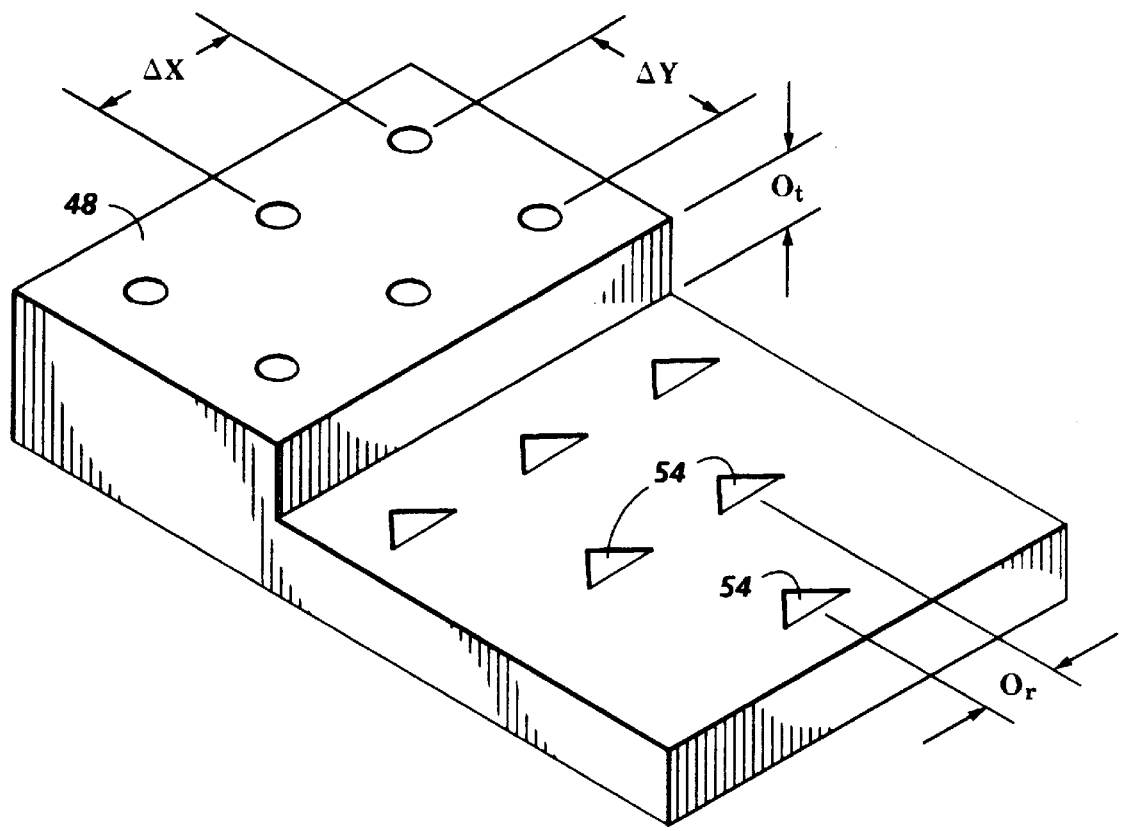
Figure 6:
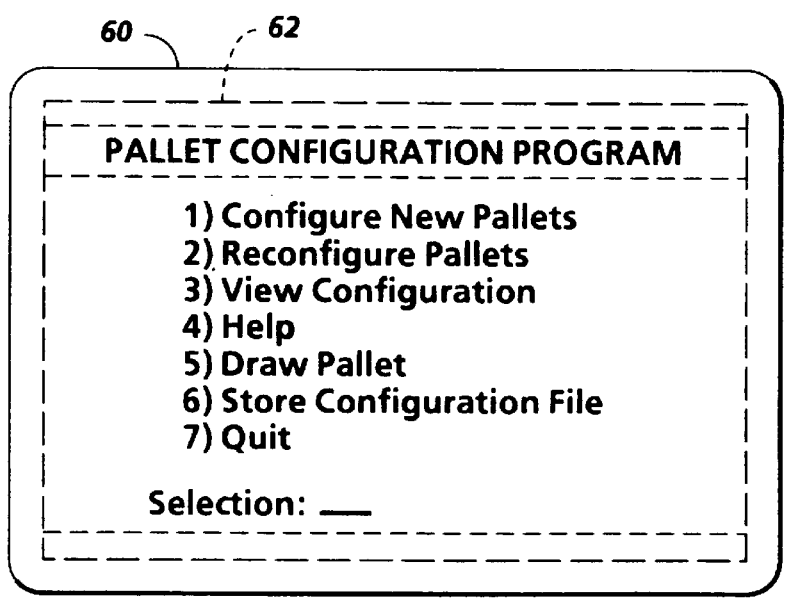
FIG. 6 is a representation of the menu screen generated by the present invention and displayed on the user interface shown in FIG. 1.
Figure 7A:
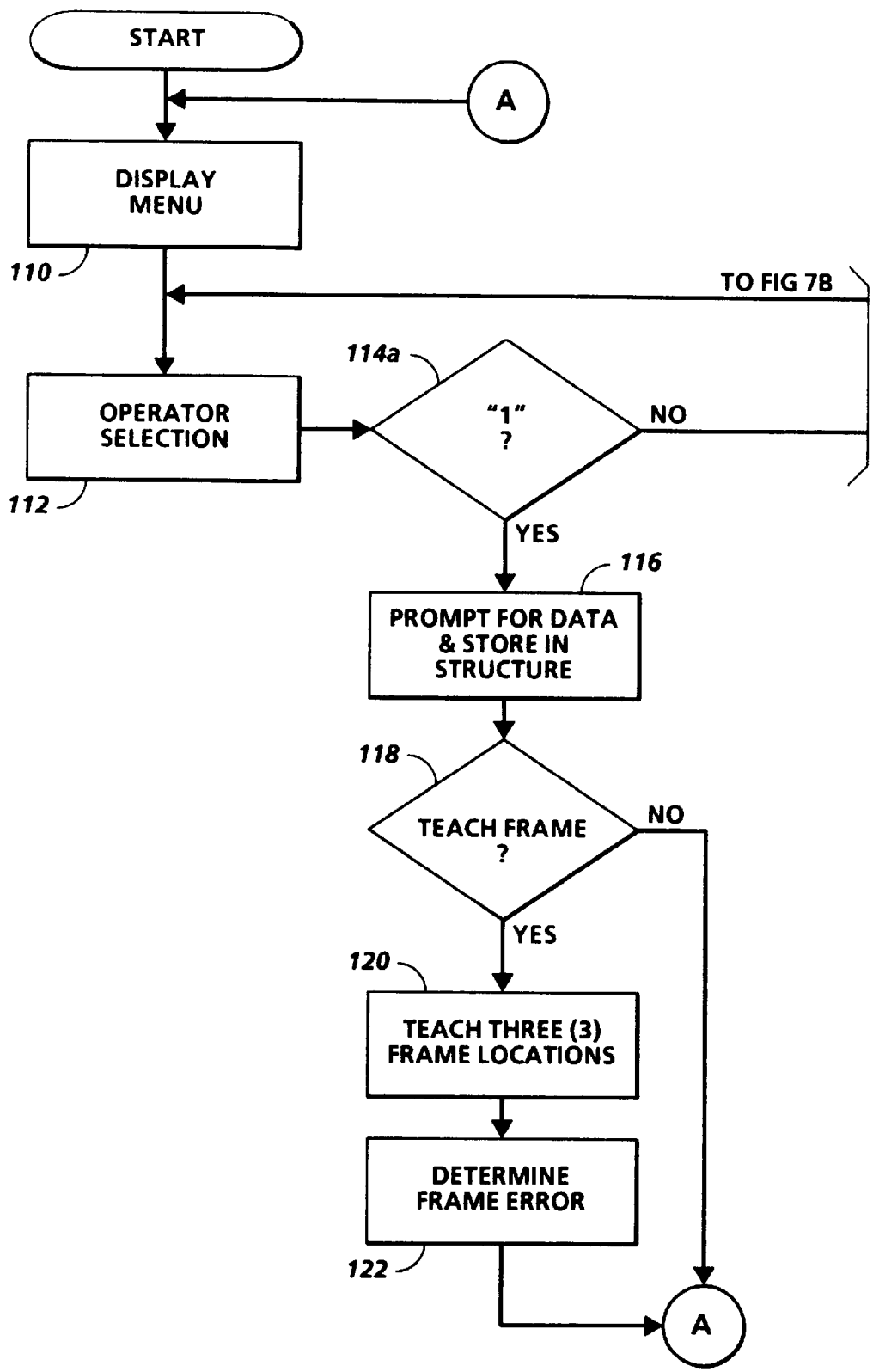
FIGS. 7A–7D comprise a flowchart which illustrates the various processing steps carried out by the robot controller of FIG. 1 while a user is exercising t pallet configuration functions of the present invention.
Figure 7B:
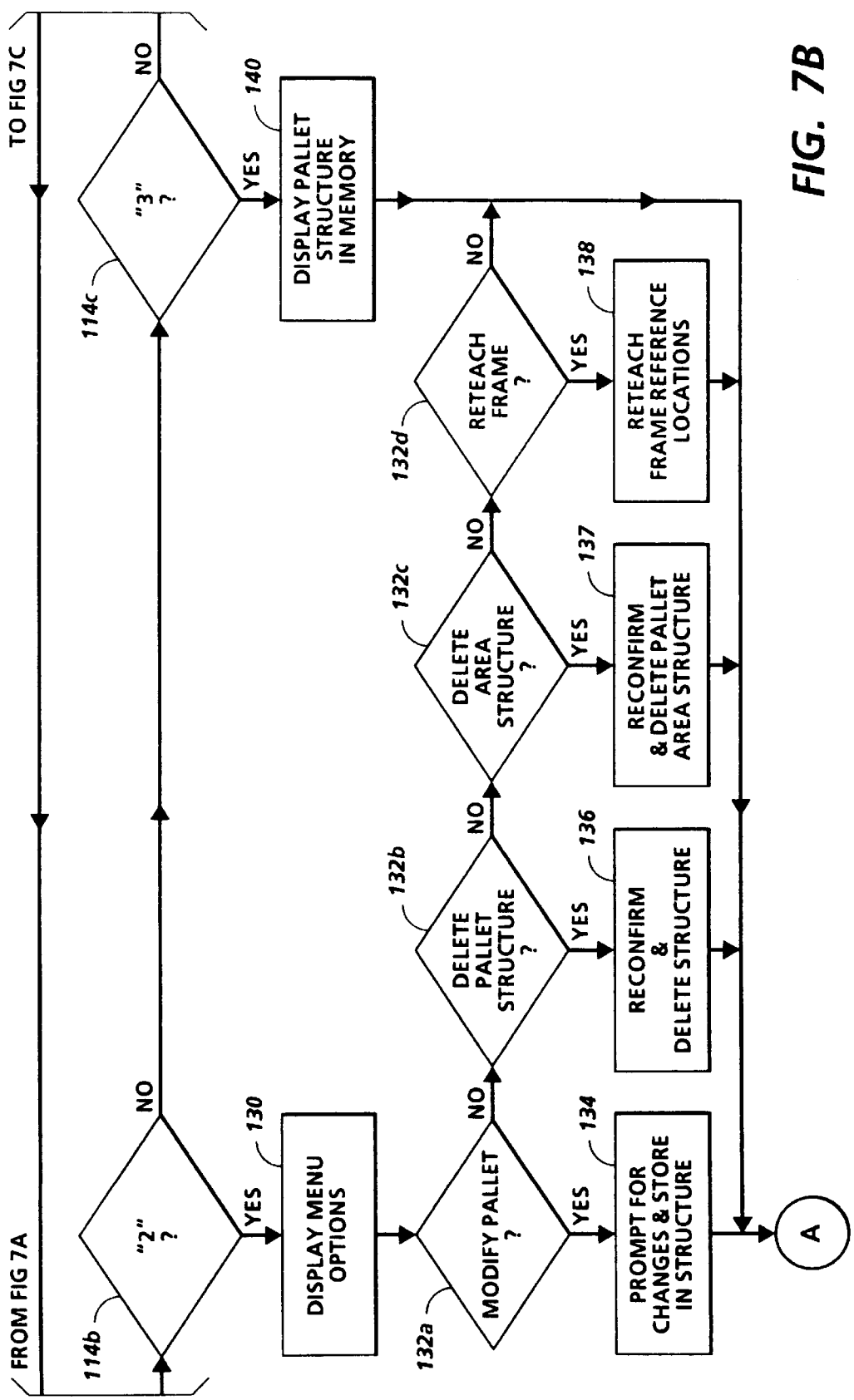
Figure 7C:
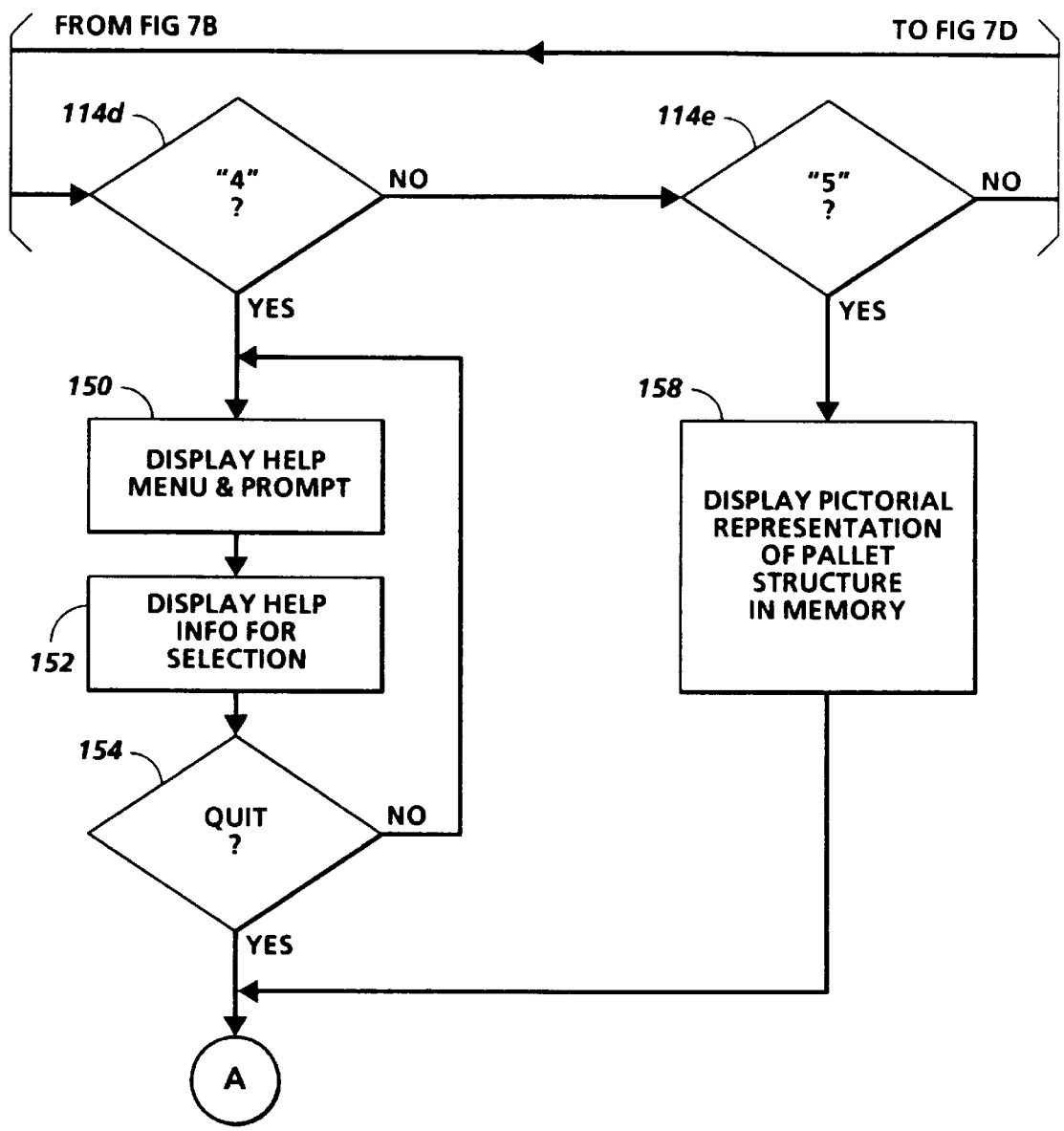
Figure 7D:
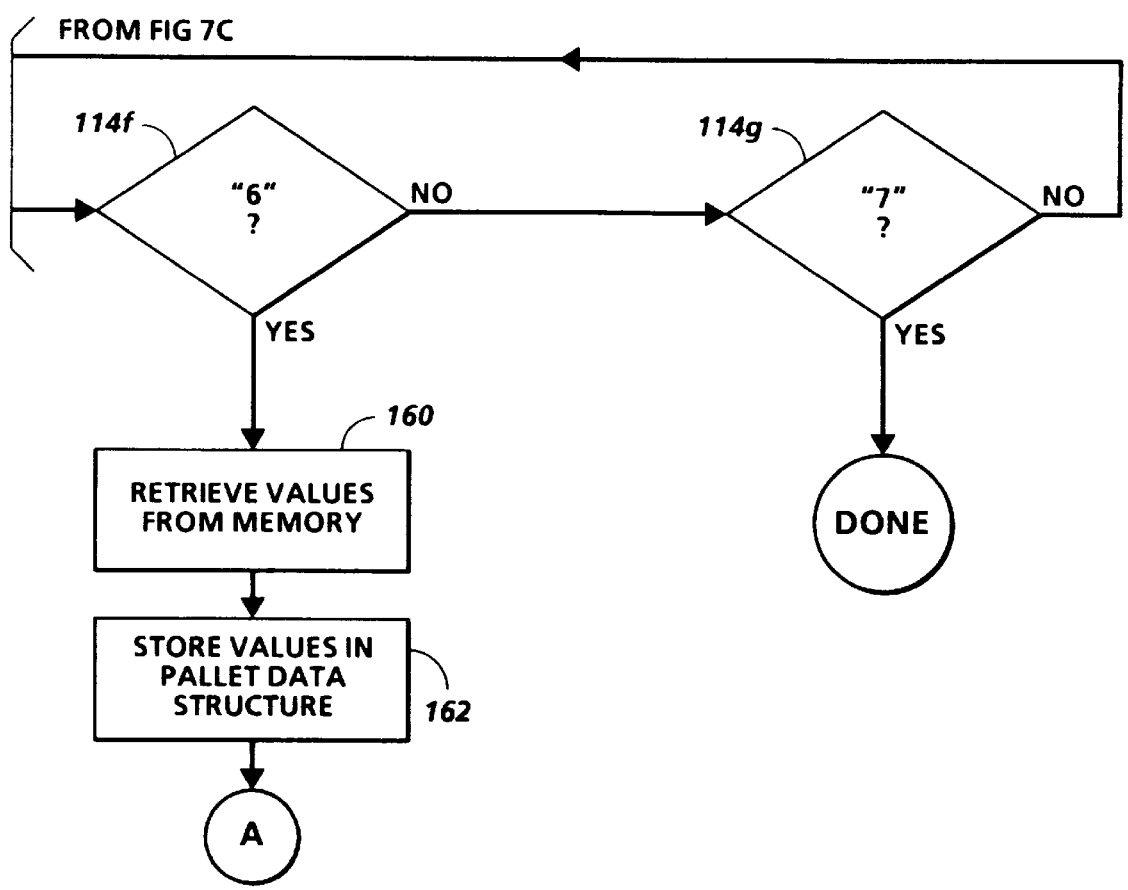

Turning now to FIG. 3, which illustrates the layout of a robot assembly cell in the FAS, conveyor 46 delivers parts or workpieces (not shown) on trays referred to as pallets, 48, which are in turn placed in one of the pallet locations indicated by reference numerals 50. Prior to using a tray, the robot must know the geometry of the tray. In other words, the robot must be instructed as to the configuration of the tray and the workpieces contained thereon. For example, as represented by the two alternative tray geometries in FIGS. 4 and 5, trays 48 must have critical parameters such as row spacing $\Delta x$, column spacing $\Delta y$, tier offset $o_r$, row offset or and other geometrical characteristics determined before the robot can locate the workpieces, 54, contained thereon. Previously, pallet geometries were specified to the robot by manually creating a data structure or file with an editor available on the Adept robot controller. However, the present invention incorporates a menu-based user-interface program which may be utilized to prompt the operator for the basic tray geometry and to calculate the required positional information using the information input by the operator.

The pallet configuration menu utility, assists operators wishing to define a set of pallet geometries and, as shown on a video display 60, has a series of options to produce user-interface (U/I) screen 62. The general operation of the pallet configuration program is represented by the flowchart illustrated in FIG. 7, in conjunction with the software listing contained in Appendix A. Initially, the software displays U/I screen 62, block 110, which prompts the user for a selection of the desired operation. Upon a selection by the operator, block 112, the designated operation will be initiated by one of the seven test blocks 114a–g, which test the operator's selection.

Upon selecting the first option, "Configure New Pallets", the user is prompted to fill in various characteristics of the pallet. Specifically, the operator is required to fill in information including, but not limited to, the following: pallet location; number of areas on the pallet; least number of parts in an area; number of rows in each area; number of columns in each area; number of tiers in each area; tier offset; part name in each area; total number of parts in each area; $\Delta x$ (row offset); $\Delta y$ (column offset); area frame error; and status of robot pallet position in the assembly. Once entered, the characteristics are used to calculate the nominal locations of workpieces. After entering the appropriate information at block 116, the operator is then queried as to whether it is necessary to teach a frame, block 118.

Teaching a frame, block 120, involves placing the robot in a condition which allows a manual control pendant to control the position of the robot. Using the control pendant, the operator is instructed to first move the robot to contact the registration corner location of each pallet, illustrated in FIG. 3 by reference numeral 56. Subsequently, the operator is instructed to move the robot to the farthest point along the x-axis, or in other words, the corner of the pallet in the x-direction, and similarly the farthest point along the y-axis. Once the positions are manually taught, they are returned from the robot and stored in the data structure which defines the pallet. Next the pallet frame error is calculated at block 122, as described by the inventors in the *Xerox Disclosure Journal* publication entitled "Automatic Correction of Robot Displacement Errors", published in September/October 1992, Vol. 17, No. 5, and incorporated herein by reference.

Figure 8:
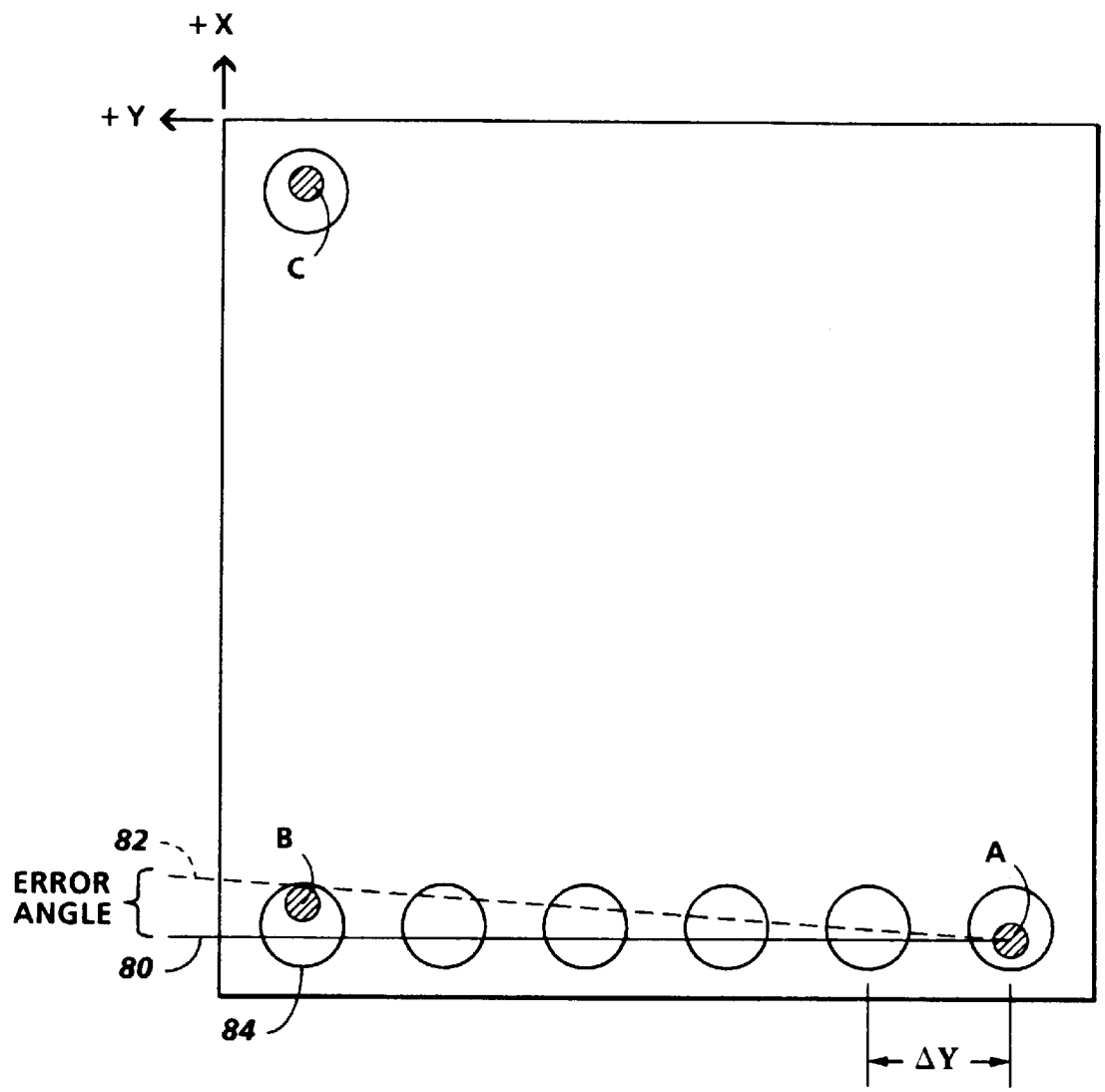
FIG. 8 is a detailed illustration of the various frame locations taught by an operator during the execution of the new pallet configuration operations as represented on the menu screen of FIG. 6 and as detailed by the process steps of FIG. 7.

As illustrated in FIG. 8, shaded locations A, B, and C represent the three frame locations taught by the operator in the previous step. The horizontal line, reference numeral 80, represents the desired path of the robot. However, due to the inherent inaccuracy within the robot cell arising, for example, from both horizontal and vertical elastic deflections in structural members of the robot, or from teaching of the frame in a "free" mode when the gears and linkages are relaxed, positioning error about the frame is inherent. Thus, by teaching the robot frame locations A, B and C, the actual path which the robot will follow falls along a line that is often angled or skewed with respect to the desired path, for example, line 82 in FIG. 8. As an example, a command which directs the robot to move five columns in the y-direction could result in the robot being positioned at B, rather than at the exact center of the location of the sixth part location, represented by reference numeral 84.

At step 122, the operator has the option of entering the maximum frame positioning error manually, or allowing the robot to automatically calculate it. To calculate the frame positioning error automatically, the program moves the manipulator about the pallet simulating operation during production. When the robot gets to the furthest points on the pallet it stops and records its position. If the robot is not exactly on the taught reference point, where it is supposed to be, it subtracts this difference and labels it epsilon. Then, the next time the robot runs, it automatically corrects its path by a computed incremental epsilon to get closer to the original target positions of parts along its path. Whatever the method employed, the result is that the frame positioning error is added to the pallet's area structure. As yet another alternative, the operator can avoid teaching all three points, and manually enter coordinates for three points, two points, or just one point. When the teaching steps are completed, control is returned back to the upper level at block 110 where the main menu will again be displayed.

Upon selection of the "Reconfigure Pallets" option at test block 114b, the applications process running in the robot controller first builds a secondary menu screen at block 130 that displays on U/I 60 four possible functions; modify pallet structure, delete pallet structure, delete area structure, and reteach frame. If the modify pallet option is selected, as determined by test block 132a, the pallet configuration characteristics, similar to those described above with respect to defining a new pallet, are displayed and the operator may change some or all of the parameter values. As represented by block 134, the values are then saved in memory. The values may be permanently stored in the data structure which defines the altered pallet upon selection of the sixth option of the main menu, displayed on U/I 62, "Store Configuration File" and represented by test block 114f. The remaining three selections are deletion operations that, as reflected by blocks 136, 137 and 138, can respectively delete either an entire pallet structure contained in memory or simply an area that has been defined on a pallet, or allows the reteaching of frame reference locations for a specified pallet area.

Turning to the next possible selection from the main menu, the "View Configuration" option, test block 114c, displays the details of the pallet structure contained in the memory of the robot controller. More specifically, this is a listing of the parameters previously entered by the operator and/or calculated by the robot controller prior to the last time they were saved in the memory 32. This option may be used to confirm or check the configuration of the pallet.

The next functional option displayed on the user-interface screen is the "Help" option which, as selected via test block 114d and as reflected by blocks 150, 152 and test block 154, is a looping process. The Help option displays a secondary menu of help options and, upon selection by the operator, the desired help information. Upon selection of the "Draw Pallet" option, test block 114e, from the main menu, the software actually draws a picture of whichever pallet was selected onto U/I screen 62. In many instances, the drawing may be used by the programmer to verify that the right data has been input. Ideally, the representation of the pallet on the screen would look like the pallet that was being modeling. If none of the functional choices are selected by the operator, the "Quit" option may be selected via test block 114e, to cause the application process to exit from the pallet configuration software. Furthermore, any invalid selections will be ignored by the software process.

Having described the basic operations of the individual workcells, and the interaction between the robot and pallet, as controlled by the robot controller, attention may be turned to the manufacturing process associated with the flexible assembly system, and more specifically to the use of error data generated by one or more robot controllers during the assembly operations. In the FAS, a number of workcells, similar to that depicted in FIG. 3, may be connected in series or in parallel to perform assembly operations on workpieces provided to the workcells on pallets. Having previously defined the locations of parts and/or workpieces on each pallet type used by the workcell, a pallet identifier and workpiece location then serves as an identifier for each of the workpieces contained thereon. Accordingly, any errors detected during assembly or inspection of the assembled workpieces can be referenced, using the previously described pallet configuration data structure, at any time based upon the pallet location. This information is communicated from the application program, which is controlling the assembly of the workpieces on the robot controller, to the cell controller and then to other manufacturing databases so as to accurately track and control the disposition of defective workpieces.

In one embodiment, at least three alternative systems may be employed to achieve part and defect detection. The first two systems implemented were physically attached to the robot manipulator, while the third system was a manual inspection or rework station. More specifically, the first system was a commonly known vision system using a camera to verify part presence or absence. The second implementation was a force sensor that indicated a problem with the assembly process when the force, or load exerted by the robot did not fall within defined limits. For instance, either too much force or too little force was applied to accomplish the operation. The third defect detection method was a manual inspection/rework station where an operator provided the defect feedback as a result of visual or other analysis of the assembly. Upon detection of an error or defect, the error information that is returned to the cell controller includes the pallet location, an error identifier, an area identifier, row, and column. The workcell, in communication with a conveyor barcode reader (not shown), adds one more identification element, a pallet ID. Thus, the "system" knows where the error occurred, what the error was, which pallet contains the workpiece with the error, and exactly which component is affected.

The error information, referred to as process error data, may be generated by a number of occurrences, including, but not limited to: missing parts, misaligned pallets, excess force applied by the robot during assembly, or a missing tool for the robot. Similarly, additional process error data could be generated through the use of external devices which are commonly available, such as vision systems and electrical signature analysis systems, each providing negative feedback when a fault is detected in the process or upon inspection of an assembled workpiece.

The use of process error data will be described with respect to the assembly process steps illustrated in FIGS. 9A and 9B. The steps executed within region 208 represent those steps carried out locally by the robot under the control of a robot controller, which in turn is monitored and controlled by a cell controller. As represented by step 200, there may be one or more prior assembly steps conducted on some of the workpieces supplied to workcell 48 of FIG. 3. Subsequently, as step 202 and 204 illustrate, assembly operations are carried out by the local robot and tested to determine whether they have completed successfully or whether an error or defect was detected. As described in detail below, the defect detection means may be any tool, device or process suitable for generating an indication of an error in the assembly process, preferably a numerically encoded indication. Once the workpieces are assembled, the pallet is then passed to a subsequent stage of the process, represented by step 206, where further processing may occur, or where the workpiece may be installed in the final product.

Figure 9A:
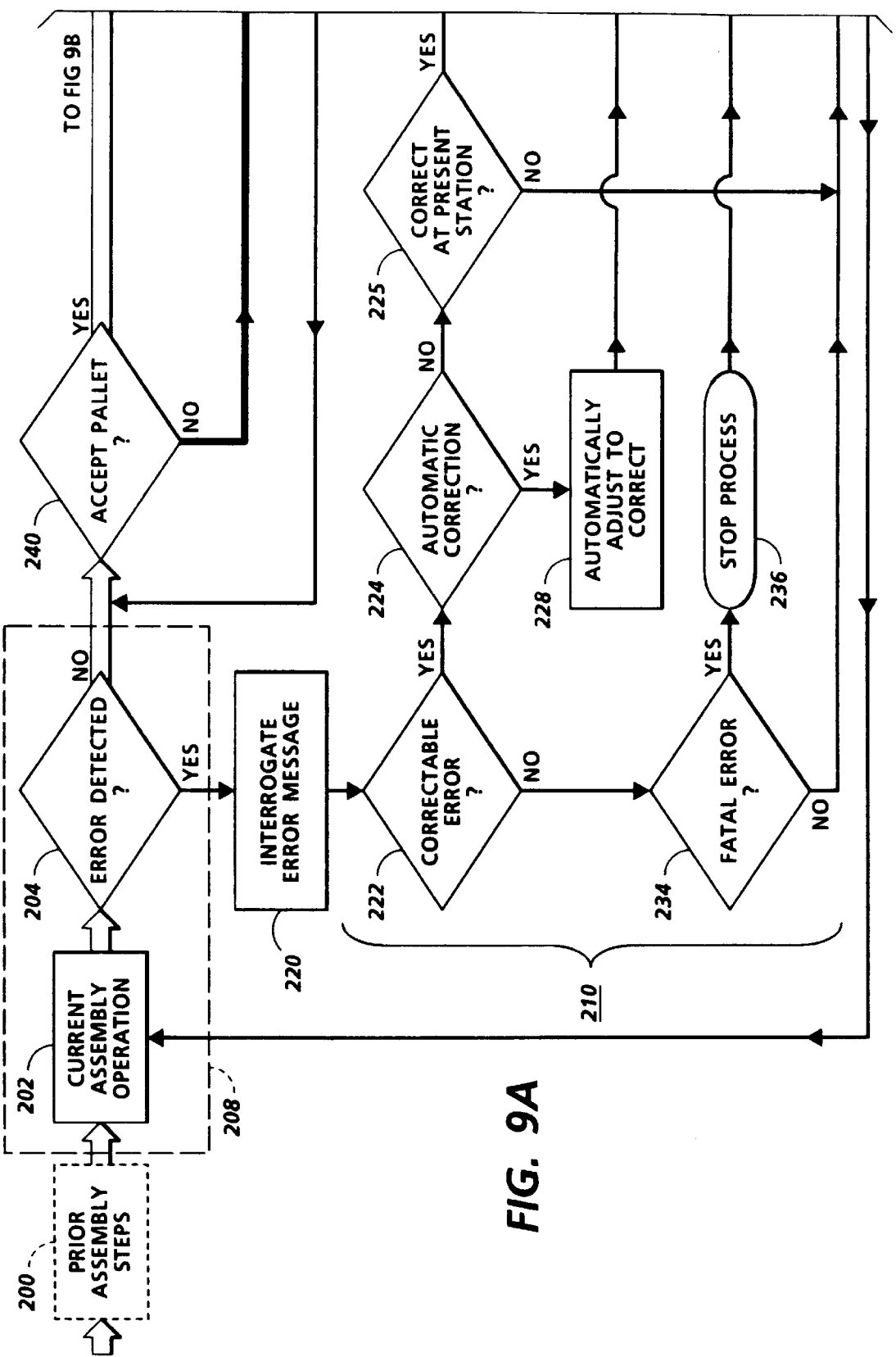
FIGS. 9A–9B show a general flowchart representing the integration of a flexible assembly system incorporating the present invention in a manufacturing process.
Figure 9B:
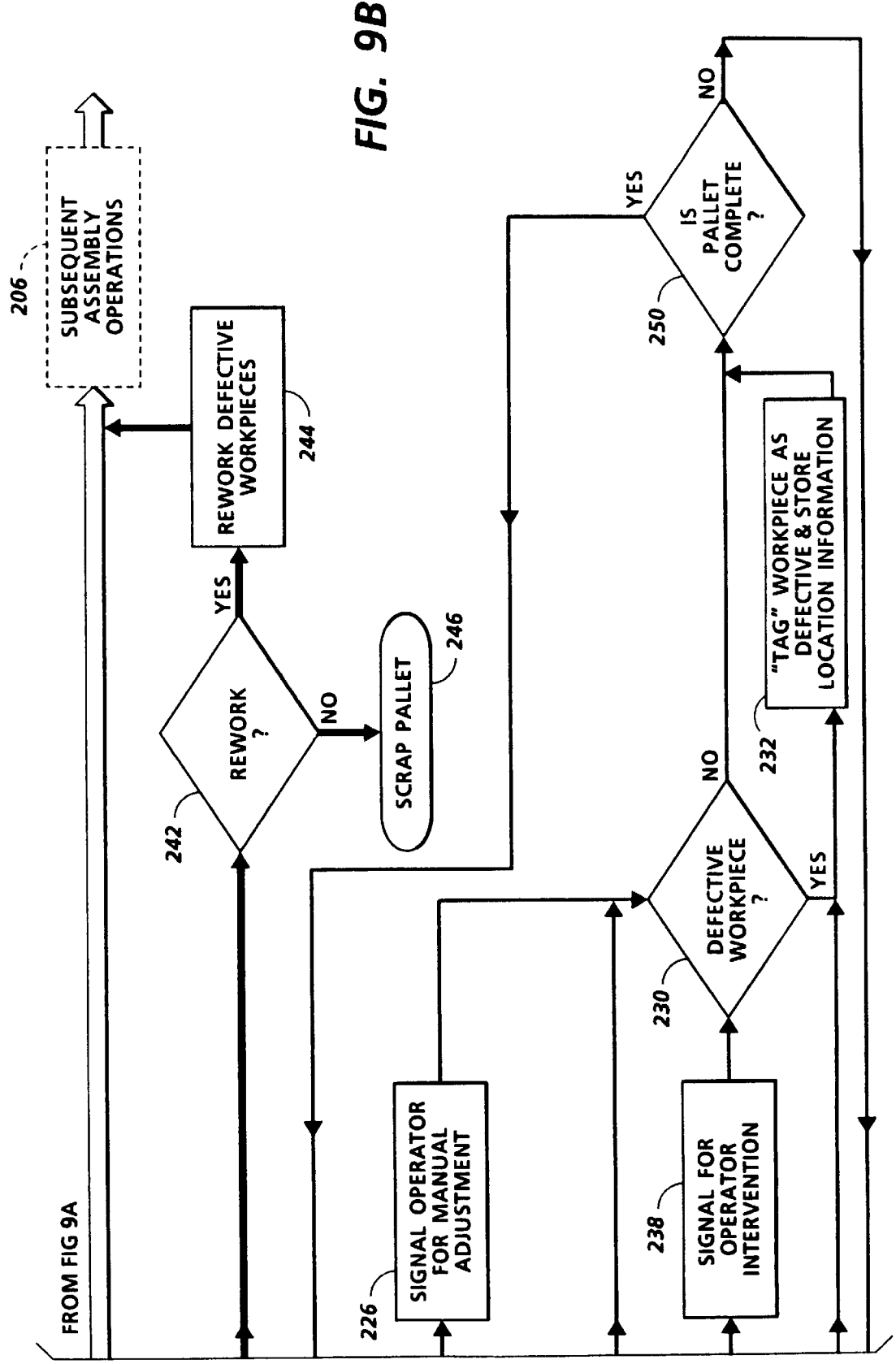

As shown in detail in FIGS. 9A and 9B, when an error is detected by error checking step 204, which is likely to be an integral part of assembly operation 202, the first operation conducted by the application process executing on the robot controller is to interrogate the process error data, step 220. This step essentially determines where the error has been reported from, for example the robot or an inspection device object, and what type of error was detected. The present embodiment represents the error numerically. If the error is attributable to the robot, the assigned error number will correspond with the robot manufacturer's hardware error numbering scheme. If the error is not attributable to the robot, for instance when a part is either missing or defective, or when the end of arm tooling is missing, a predefined, application specific or library type number is assigned. For example, application specific numbers would be used to indicate a force sensor detected error indicating possible part damage due to excessive force being applied, while a library type error (common to all applications) would indicate that a tool was not attached, a part was missing, etc. Having determined the specifics of the error, the process error data is then reported to the cell controller via the communication channel previously described with respect to FIG. 1. As indicated by the steps depicted in region 210 of FIG. 9, the cell controller then acts to respond to the process error data received from the robot controller.

More specifically, the robot controller first tests to determine if the error reported is correctable, step 222, and if so takes further action to determine if the error is one which may be automatically corrected, as determined by step 224. The robot determines the following:

1) whether the error is correctable (e.g., whether to try to pick up a part a second time);
2) whether the error is something which it has no control over (e.g., a missing part, which it would simply know to skip over and continue to the next part); or
3) whether it needs operator assistance. When the robot needs help, it requests it by sending the appropriate error number directly to the cell controller. This decision process may be accomplished using the "limited intelligence" within the robot. In addition the cell controller might also be programmed to send an operator to investigate when it receives a predefined number of correctable errors from a particular robot, even though the robot has not signaled for help. In such an embodiment, the cell controller would be tracking the errors. The robot (slave) would simply "push" the information over to the cell controller (master), thereby accomplishing the robot's primary responsibilities of simply building and communicating. Assuming that an error cannot be corrected automatically, step 225 would determine whether the error was correctable at the present station. If not, the workpiece would be tagged as defective, step 232, and corrected at a subsequent station. Otherwise, when the error is correctable at the present station, step 226 would signal the operator at the workcell to intervene and/or manually adjust the robot, workpieces or pallets to enable subsequent assembly to continue. If automatic correction were possible, step 228 would depict the application program, running on the robot controller, generating the commands which direct the robot to carry out the adjustment and continue assembling the workpieces. In either situation, the workpieces for which an error was detected would be marked or "tagged" by the robot controller, and then the information is subsequently transmitted to the cell controller, which records the workpiece location and pallet identification in a storage memory in order to assure that subsequent inspection of the workpiece closely scrutinizes whether it was properly assembled.

If the process error data indicated that the error was not correctable, by a negative response in test step 222, the robot controller would then determine, via step 234, whether the error was fatal. Generally, a fatal error is one from which the robot controller is unable to recover without intervention, such as a robot crash. In this case, the assembly operations of the robot are stopped, step 236, and the robot controller returns a command to the cell controller to signal the workcell operator to intervene and rectify the reported problem. After the operator has resolved the problem, he/she inputs directly to the robot controller whether a defective workpiece has resulted from the error, step 230. This information is then passed to the cell controller and if the answer is yes, the cell controller tags the workpiece by storing its location and pallet identification information into memory, step 232. All defects which may result in a substandard assembly, whether they are created due to a malfunction in the process, or due to substandard pieces in supply, are tagged and processed by the cell controller in the same way. The "prognosis" of all workpieces and assemblies within the system is known at the cell controller at all times. Once the defective workpiece is tagged, the cell controller determines, at step 250, whether the pallet has been completed. If not, processing continues at step 202 where the assembly operation is accomplished for the next workpiece on the pallet. If assembly of all the workpieces on the pallet was completed, further processing will be accomplished by the cell controller as described hereafter.

Subsequent to handling the process error data, including tagging defective workpieces if necessary, the cell controller may make further decisions based upon the process error which was reported. For example, the cell controller would make decisions with respect to the future use of the workpieces contained on the pallet, for example step 240, either accepting the pallet, preferably when defect free, or rejecting the pallet containing defective assembled workpieces. If rejected, the cell controller may further determine at step 242 whether the rejected pallet may be sent to a rework station, step 244, where the defect may be manually corrected, or to scrapping operation 246 where the entire pallet may be scrapped.

In the situation where the pallet is rejected and sent for rework, represented by step 244, the tagged workpieces, those having been identified as exhibiting a defect, may be graphically identified for the rework station operator based upon the information stored in memory by the cell controller. The cell controller can send a pallet to a manual rework station, bundled with the pallet's process error data record, so that a local terminal at the rework station may be used to display the defect assemblies. Specifically, having previously identified the characteristics of the pallet, as well as the location of the defective workpieces, the rework station can generate a display screen which represents the pallet, including workpiece locations, the exact location of the defective workpieces thereon, and detailed information as to the nature of each defect. An operator at the rework station can then either remove, replace, or rework the defective workpiece, depending upon the defect identified, thereby enabling the pallet to proceed for subsequent processing.

The features enabled by the pallet characterization and process error data enable the cell controller to cooperate with the application programs running on the robot controller to not only increase the flexibility of the assembly system described, but to significantly reduce the amount of scrap generated. Due to the almost instantaneous feedback of process error data to the cell controller, there is an imperceptible time lag during which defective workpieces are being assembled. Furthermore, because of the ability to quickly detect workpiece assembly errors, the need for a final inspection process can be eliminated as well.

In recapitulation, the present invention uses the characteristics of the pallet to uniquely identify workpieces which were determined to be defective during the automatic assembly operation. The defect information is then stored in a cell controller for later recall in order to determine what, if any, further processing should be conducted on the defective workpieces.

It is, therefore, apparent that there has been provided, in accordance with the present invention, a method and apparatus for improving the flexibility of an automated assembly system, while increasing efficiency and reducing the scrapping of defective parts. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX

```
ZGA3:[150013]PALLET.CFG;3          21-AUG-1990 10:34:55.33                    1

.PROGRAM cfg.calcerror(pallet.loc, area, actual.loc, approach, frame.error)
;;Authors: Marta Galuga, Jay Glaspy
;;Date: February 1, 1990
;;
;;Requires:
;       -Integer: pallet.loc,area
;       -Location: actual.loc
;       -Integer: approach
;;Returns:
;       -Real: frame.error
;;Description:
;       This function automatically calculates the frame error associated
;       with the given pallet location (pallet.loc) and area (area). The
;       robot arm will approach two points on the pallet at a set distance
;       (approach). The two points are at opposite ends of the pallet, the
;       first point is the reference point. The difference ( in the x axis
;       only) between the actual location of the second point (actual.loc) and
;       the location moved to by the arm as a transformation of the reference
;       is the frame error (frame.error).
;
; * Note: The present conveyor system at Xerox has precision pin stops which
;       guarantee that the pallet will always be seated squarely relative to
;       the base of the robot.  If this were not the case, this idea of
;       calculating the the x axis frame offset can easily be extended to
;       calculate and compensate for the y-axis skew as well.

;@Copywrite 1990, Xerox Corporation
;***********************************************************************

AUTO REAL x, y, z, maxrows, maxcols, actual.loc.x, trans.loc.x
        AUTO REAL distance
        AUTO LOC ref, trans.loc CALL p.getoffs(pallet.loc, area, x, y, z, ref)
        CALL p.getbounds(pallet.loc, area, maxrows, maxcols)
        distance = y*(maxcols-1) ;furthest point from reference on y axis.
        DEPART 750-DZ(HERE)
        APPRO ref, approach
        BREAK
        APPRO ref:TRANS(,-distance), approach
        BREAK
        HERE trans.loc
        actual.loc.x = DX(actual.loc)
        trans.loc.x = DX(trans.loc)
        IF ERROR(-1,0) < 0 THEN
            TYPE "Error occurred while calculating frame error."
            TYPE "Use Reconfiguration program to input a value."
            frame.error = 0
        ELSE
            frame.error = trans.loc.x-actual.loc.x ;x-axis difference
        END
        TYPE "Frame error is ", frame.error, " millimeters."

.END
.PROGRAM cfg.calcframe(pallet.loc, area)
;;Authors: Marta Galuga, Jay Glaspy
;;Date: February 1, 1990
;;
;;Requires:
;       -Integer: pallet.loc,area
;;Returns: none.
;;Description:
;       This function teaches a frame for the given pallet location
;       (pallet.loc) and area (area).  It sets up a dialog on the manual
;       control pendant that the user follows to teach the three points
;       of the frame.
;Side Effects:
;       -types messages to screen.
```

```
ZGA3:[150013]PALLET.CFG;3          21-AUG-1990 10:34:55.33            2

;      -types messages to manual control pendant.
;      -queries user for terminal input.
;      -queries user for manual control pendant input.
;      -modifies pallet.config[,,].
;
;@Copyvrite 1990, Xerox Corporation.
;***********************************************************************

AUTO $clear.display, taughtlst, taught2nd, taught3rd, done, del
       AUTO $str, $d
       AUTO REAL d, quit, err, ans
       AUTO LOC ref, f0, f1, f2

DETACH (0) ;detach program control
       ATTACH (1) ;attach pendant

TYPE /C24, /U23
       TYPE "TEACHING FRAME FOR PALLET LOCATION ", pallet.loc, " AREA ", area
       TYPE "Arm Configuration", /C0, /X5, "1- LEFTY", /C0, /X5, "2- RIGHTY"
       PROMPT "Selection", $ans
       IF VAL($ans) <= 1 THEN
           TYPE "Teaching points in LEFTY mode."
           LEFTY
       ELSE
           TYPE "Teaching points in RIGHTY mode."
           RIGHTY
       END
       TOOL NULL
       TYPE /C2
       TYPE "Use Manual Control Pendant to teach the frame for this area."
       TYPE "Follow the directions on the pendant message display."
       TYPE "DEFINITIONS (world coordinates):"
       TYPE /X10, "Origin (reference): most (-x,-y) coordinate of area."
       TYPE /X10, "X axis endpoint: most (+x,+y) coordinate of area."
       TYPE /X10, "Y axis endpoint: most (-x,+y) coordinate of area."

taughtlst = FALSE ;these three variables keep track of which points
       taught2nd = FALSE ;are actually taught. This is to enable backtrack-
       taught3rd = FALSE ;tracking for reteaching points.
       $clear.display = $CHR(12)+$CHR(7)
       KEYMODE 8 = 2 ;sets REC/DONE key to level mode.
       KEYMODE 23 = 2 ;sets COMP/PWR key to level mode.
       KEYMODE 56 = 2 ;sets DEL key to level mode.
       DO ;teach 1st location
           WRITE (1) $clear.display
           WRITE (1) "Move to origin. Press DONE key to"
           WRITE (1) "teach point.", /S
           DO
               WAIT
               del = PENDANT(56)
               done = PENDANT(8)
           UNTIL (done OR del) ;until done or del key is pressed.
           DO
               WAIT
           UNTIL NOT PENDANT(8) AND NOT PENDANT(56) ;until keys are released.
           IF done == TRUE THEN
               taughtlst = TRUE ;user signals completion of 1st point.
               HERE f0
               SET framepts[pallet.loc,area,0] = f0
               DO ;teach 2nd location
                   WRITE (1) $clear.display
                   WRITE (1) "Move to X axis endpoint. Press"
                   WRITE (1) "DONE to teach point, DEL to go back.", /S
                   DO
                       WAIT
                       del = PENDANT(56)
                       done = PENDANT(8)
                   UNTIL (done OR del) ;until done or del key is pressed.
```

ZGA3:[150013]PALLET.CFG;3                 21-AUG-1990 10:34:55.33                          3

```
                DO
                    WAIT
                UNTIL NOT PENDANT(8) AND NOT PENDANT(56)
                IF done == TRUE THEN ;user signals completion of 2nd point
                    taught2nd = TRUE
                    HERE f1
                    SET framepts[pallet.loc,area,1] = f1
                    DO ;teach 3rd location
                        WRITE (1) $clear.display
                        WRITE (1) "Move to Y axis endpoint. Press"
                        WRITE (1) "DONE to teach point, DEL to go back.", /S
                        DO
                            WAIT
                            del = PENDANT(56)
                            done = PENDANT(8)
                        UNTIL (done OR del) ;until done or del key is pressed.
                        DO
                            WAIT
                        UNTIL NOT PENDANT(8) AND NOT PENDANT(56)
                        IF done == TRUE THEN ;3rd point is ok.
                            HERE f2
                            SET framepts[pallet.loc,area,2] = f2
                            taught3rd = TRUE
                        ELSE ;reteach 2nd point.
                            taught2nd = FALSE
                        END
                    UNTIL (taught3rd OR NOT taught2nd)
                ELSE ;reteach 1st point.
                    taught1st = FALSE
                END
            UNTIL (taught2nd OR NOT taught1st)
        END
    UNTIL taught1st == TRUE IF NOT PENDANT(23) THEN ;make sure comp/pwr key is pressed.
        WRITE (1) $clear.display
        WRITE (1) "Press COMP/PWR key..."
        DO
            WAIT
        UNTIL PENDANT(23)
    END SET ref = FRAME(f2,f1,f0,f0)
    CALL p.setref(pallet.loc, area, ref)

WRITE (1) $clear.display
    DETACH (1)
    ATTACH (0)
    ;epsilon frame error
    $str = "Input Frame Error Estimation (-1 -automatic calculation, h- Help):"
    CALL cfg.getans($str, "cfg.errorhelp", ans)
    IF ans > -1 THEN
        CALL p.setfield(ploc, acount, c.epsilon, ans)
        pallet.config[ploc,acount,11] = ans
    ELSE ;calculate frame error automatically.
        TYPE "COMPUTING FRAME CALCULATION ERROR FOR PALLET ", pallet.loc, " AREA "
        TYPE "CAUTION: The robot will depart and approach two random points on"
        TYPE "         pallet", pallet.loc, ".", /S
        quit = FALSE
        DO
            PROMPT "Enter approach distance [default 50mm]:", $d
            IF $d == "" THEN
                d = 50
            ELSE
                d = VAL($d)
            END
            IF d == 0 THEN
                PROMPT "Zero approach distance entered. Would you like to quit [y/
```

```
                        IF $confirm == "y" THEN
                              quit = TRUE
                        END
                  ELSE
                        TYPE /C1, "Clear the robot area and press <Return>."
                        PROMPT "", $d
                           ;currently only compensates for errors along the x-axis.
                        CALL cfg.calcerror(pallet.loc, area, f2, d, err)
                        CALL p.setfield(pallet.loc, area, c.epsilon, err)
                        PROMPT "Press <Return> to Continue...", d
                        quit = TRUE
                  END
            UNTIL quit == TRUE
      END                        ;end automatic calculation.
.END
.PROGRAM cfg.drawpal()
;;Author: Salena  Y. Pitts
;;Date: July 9, 1990
;;Requires: none.
;;Returns: none.
;;Description:
;     This program allows the user to view the true picture of a pallet
;     structure.
;;Side Effects:
;     - types messages to the screen and/or waits for user input.
;
;@Copywrite 1990, Xerox Corporation
;***********************************************************************

AUTO $ans, ans, pallets[11], x, i
      AUTO REAL maxrows, maxcols, maxparts, f, temp
      AUTO quit DO
            TYPE /C24, /U23
            FOR i = 1 TO 77
                  TYPE "*", /S
            END
            TYPE /C0
            TYPE "*", /X24, "DRAW PALLET STRUCTURE           ", /X23, "*"
            FOR i = 1 TO 77
                  TYPE "*", /S
            END
            TYPE /C1
            x = 1
            FOR i = 1 TO 10
                  IF DEFINED(pallet.config[i,,]) THEN
                        TYPE x, "- PALLET LOCATION ", i, "."
                        pallets[x] = i
                        x = x+1
                  END
            END
            TYPE x, "- QUIT."
            quit = x
            TYPE "Enter Selection For the Pallet to Draw: ", /S
            PROMPT "", $ans
            ans = VAL($ans)
            IF (ans > 0) AND (ans <> quit) THEN
                  ploc = pallets[ans]
                  FOR i = 1 TO 10
                        IF DEFINED(pallet.config[ploc,i,]) THEN
                           ;get current values.
                              maxrows = pallet.config[ploc,i,c.maxrows]
                              maxcols = pallet.config[ploc,i,c.maxcols]
                              maxparts = pallet.config[ploc,i,c.maxparts]

TYPE /C1
                              temp = maxrows
```

ZGA3:[150013]PALLET.CFG;3          21-AUG-1990 10:34:55.33                    5

```
                    WHILE temp > 0 DO
                        FOR i = 1 TO maxcols
                            TYPE "* ", /S
                        END
                        TYPE
                        temp = temp-1
                    END
                    FOR j = 1 TO (maxcols*2)
                        TYPE "_", /S
                    END
                END
            END
            TYPE
            PROMPT "Press <Return> to Continue...", d
        ELSE
            IF ans <> quit THEN
                TYPE "NO PALLET SELECTED."
            END
        END
    UNTIL ans == quit .END
.PROGRAM cfg.errhandler()
;;Authors: Marta Galuga, Jay Glaspy
;;Date: February 1, 1990
;;
;;Requires: none.
;;Returns: none.
;;Description:
;       This function is called by the system whenever an error occurs during
;       the pallet configuring process.  The only action taken is to cause the
;       program that initiated the error to proceed.  Therefore, if errors
;       occur, the current program will proceed until its end or until the user
;       is asked for additional input.
;Side Effects:
;       -types error message on screen.
;@Copywrite 1990, Xerox Corporation AUTO $str $str = $ERROR(ERROR(0,0))
    TYPE $str
    TYPE "Proceeding..."

REACTE cfg.errhandler
    RETURNE
.END
.PROGRAM cfg.getans($str, $function, response)
;;Authors: Marta Galuga, Jay Glaspy
;;Date: February 1, 1990
;;Requires:
;       -String: $str,$function
;;Returns:
;       -Integer: response
;;Description:
;       This function types the message in $str and waits for input. If the
;       input is 'h' then the user is requesting help and the help function
;       given by $function is executed. The value of other user input is
;       returned to the caller (response).
;
;;Side Effects:
;       -types messages to terminal screen.
;       -queries user for terminal input.
;
;@Copywrite 1990, Xerox Corporation
;*************************************************************************

AUTO quit, $ans
```

2GA3:[150013]PALLET.CFG;3         21-AUG-1990 10:34:55.33                6

```
        quit = FALSE
        DO
            TYPE /X10, /S
            PROMPT $str, $ans
            IF $MID($ans,1,1) == "h" THEN
                CALLS $function()
            ELSE
                response = VAL($ans)
                quit = TRUE
            END
        UNTIL (quit == TRUE)
.END
.PROGRAM cfg.getarea(pallet.loc, area, cancel)
;;Authors: Marta Galuga, Jay Glaspy
;;Date: February 1, 1990
;;
;;Requires:
;       -Integer: pallet.loc.
;;Returns:
;       -Boolean: area, cancel.
;;Description:
;       This function creates a list of defined areas for the selected pallet
;       location (pallet.loc) and queries the user to select the area on which
;       they wish to operate. If a valid selection is made, 'area' = TRUE and
;       'cancel' = FALSE are returned.  If the selection is invalid,
;       'cancel'=TRUE and 'area' is undetermined are returned.
;;Side Effects:
;       -types messages to the screen.
;       -queries user for input.
;
;@Copywrite 1990, Xerox Corporation
;********************************************************************

AUTO x, i, area[10], $ans, ans cancel = FALSE
        x = 1
        FOR i = 1 TO 10
            IF DEFINED(pallet.config[pallet.loc,i,]) THEN
                TYPE x, "- AREA ", i, "."
                area[x] = i
                x = x+1
            END
        END
        TYPE "Enter Selection [1-", x-1, "]: ", /S
        PROMPT "", $ans
        ans = VAL($ans)
        IF (ans > 0) AND (ans < x) THEN
            area = area[VAL($ans)]
        ELSE
            cancel = TRUE
        END
.END
.PROGRAM cfg.getpallet(pallet.loc, cancel)
;;Authors: Marta Galuga, Jay Glaspy
;;Date: February 1, 1990
;;
;;Requires: none.
;;Returns:
;       -Integer: pallet.loc.
;       -Boolean: cancel.
;;Description:
;       This function creates a list of defined pallet structures from
;       pallet.config[,,] and queries the user to select a pallet on
;       which to operate.  If the selection is valid the selected pallet
;       location is returned (pallet.loc) and 'cancel' = FALSE. If the
;       selection is invalid 'cancel' = TRUE and 'pallet.loc' is undetermined.
```

```
ZGA3:[150013]PALLET.CFG;3           21-AUG-1990 10:34:55.33                    7

;;Side Effects:
;       -type messages to screen.
;       -queries user for input.
;
;@Copywrite 1990, Xerox Corporation
;************************************************************

AUTO x, i, quit, $ans, pallets[10], ans x = 1
        cancel = FALSE
        FOR i = 1 TO 10
            IF DEFINED(pallet.config[i,,]) THEN
                TYPE x, "- PALLET LOCATION ", i, "."
                pallets[x] = i
                x = x+1
            END
        END
        quit = x
        TYPE x, "- QUIT."
        TYPE "Enter Selection [1-", x, "]: ", /S
        PROMPT "", $ans
        ans = VAL($ans)
        IF (ans > 0) AND (ans < quit) THEN
            pallet.loc = pallets[ans]
        ELSE
            cancel = TRUE
        END
.END
.PROGRAM cfg.helparea()
;;Authors: Marta Galuga, Jay Glaspy
;;Date: February 1, 1990
;;Revised by: Salena Pitts------June 21, 1990
;;Requires: none.
;;Returns: none
;;Description:
;       This program types to the screen the definition of AREA.
;;Side Effects:
;       -type messages to screen.
;       -queries user for input.
;
;@Copywrite 1990, Xerox Corporation
;************************************************************

AUTO i, $key

TYPE /C24, /U23
        FOR i = 1 TO 77
            TYPE "*", /S
        END
        TYPE /C0
        TYPE "*", /X29, "Definition of Area", /X28, "*"
        FOR i = 1 TO 77
            TYPE "*", /S
        END
        TYPE /C0
        TYPE "*", /X75, "*"
        TYPE "*", /X12, " Pallets are divided into seperate areas.  An area is", /X10,
        TYPE "*", /X12, " a section of the pallet that differs in geometry and/", /X9,
        TYPE "*", /X12, " or part type from the other sections.  For example if", /X9,
        TYPE "*", /X12, " you were using a tooling pallet, it would consist of a", /X8
        TYPE "*", /X12, " tool holder, build area, and part dispenser which is 3 ", /X
        TYPE "*", /X12, " distinct areas.", /X47, "*"
        TYPE "*", /X75, "*"
        FOR i = 1 TO 77
            TYPE "*", /S
        END
        TYPE /C0
```

```
        PROMPT "Press <return> to continue: ", $key
.END
.PROGRAM cfg.helperror()
;;Authors: Marta Galuga, Jay Glaspy
;;Date: February 1, 1990
;;
;;Requires: none.
;;Returns: none
;;Description:
;       This program types to the screen the definition of FRAME ERROR.
;;Side Effects:
;       -type messages to screen.
;       -queries user for input.
;
;@Copywrite 1990, Xerox Corporation
;************************************************************************

TYPE /C24, u23
        TYPE "FRAME ERROR CORRECTION -  When the robot moves to a calculated"
        TYPE "location, there may be a small error between the true part location"
        TYPE "and the location to which the robot has actually moved.  This"
        TYPE "correction compensates for this error.  The value input should be"
        TYPE "the maximum x-axis difference encountered."

PROMPT "Press <return> to continue: ", $key

.END
.PROGRAM cfg.helploc()
;;Authors: Marta Galuga, Jay Glaspy
;;Date: February 1, 1990
;;Revised by: Salena Pitts--------June 21, 1990
;;Requires: none.
;;Returns: none
;;Description:
;       This program types to the screen the definition of PALLET LOCATION.
;;Side Effects:
;       -type messages to screen.
;       -queries user for input.
;
;@Copywrite 1990, Xerox Corporation
;************************************************************************

AUTO i, $key

TYPE /C24, /U23
        FOR i = 1 TO 77
            TYPE "*", /S
        END
        TYPE /C0
        TYPE "*", /X29, "Locations of Pallets", /X26, "*"
        FOR i = 1 TO 77
            TYPE "*", /S
        END
        TYPE /C0
        TYPE "*", /X75, "*"
        TYPE "*", /X75, "*"
        TYPE "*", /X15, "_____", /X21, "*"
        TYPE "*", /X15, "                                        ", /X21, "*"
        TYPE "*", /X15, "    D    |    C    |    B             ", /X21, "*"
        TYPE "*", /X15, "                                        ", /X21, "*"
        TYPE "*", /X15, "----------------------------------------", /X21, "*"
        TYPE "*", /X15, "                                        ", /X21, "*"
        TYPE "*", /X15, "-.-.-.-.-.-.-.-.-.-.-.-.-.-.-.-.-.-.-.-.", /X21, "*"
        TYPE "*", /X15, "-.-.-.-.-.-.-.-.-.-.-.-.-.-.-.-.-.-.-.-.", /X21, "*"
        TYPE "*", /X15, "_____", /X21, "*"
        TYPE "*", /X15, "                                        ", /X21, "*"
        TYPE "*", /X15, "         |    G    |    I             ", /X21, "*"
        TYPE "*", /X15, "                                        ", /X21, "*"
        TYPE "*", /X15, "                                        ", /X21, "*"
```

```
ZGA3:[150013]PALLET.CFG;3          21-AUG-1990 10:34:55.33                    9

TYPE "*", /X15, "          |                              |", /X21, "*"
        TYPE "*", /X15, "          |    F    ROBOT     H          |", /X21, "*"
        TYPE "*", /X15, "          |                              |", /X21, "*"
        TYPE "*", /X15, "          |_____                  _____|", /X21, "*"
        TYPE "*", /X75, "*"
        TYPE "*", /X75, "*"
        TYPE "*", /X26, "Pallet F = 6", /X37, "*"
        TYPE "*", /X26, "Pallet G = 7", /X37, "*"
        TYPE "*", /X26, "Pallet H = 8", /X37, "*"
        TYPE "*", /X26, "Pallet I = 9", /X37, "*"
        FOR i = 1 TO 77
            TYPE "*", /S
        END
        TYPE /C0
        PROMPT "Press <return> to continue: ", $key
.END
.PROGRAM cfg.helpmenu()
;;Authors: Marta Galuga, Jay Glaspy
;;Date: February 1, 1990
;;Revised by; Salena Pitts-----June 21, 1990
;;Requires: none.
;;Returns: none
;;Description:
;       This program provides the user with information regarding various terms
;       throughout the configuration program.
;;Side Effects:
;       -types messages to screen.
;       -queries user for input.
;
;@Copywrite 1990, Xerox Corporation
;************************************************************************

AUTO i, selection, $selection, delay, quit delay = 2
        quit = FALSE
        DO
            TYPE /C24, /U23
            FOR i = 1 TO 77
                TYPE "*", /S
            END
            TYPE /C0
            TYPE "*", /X29, "CONFIGURATION HELP", /X28, "*"
            FOR i = 1 TO 77
                TYPE "*", /S
            END
            TYPE /C0
            TYPE "*", /X75, "*"
            TYPE "*", /X22, "Please select an item:   ", /X28, "*"
            TYPE "*", /X75, "*"
            TYPE "*", /X20, "1. Configuration Program.", /X30, "*"
            TYPE "*", /X20, "2. Pallet Locations.      ", /X30, "*"
            TYPE "*", /X20, "3. Pallet Areas.          ", /X30, "*"
            TYPE "*", /X20, "4. Tiers.                 ", /X30, "*"
            TYPE "*", /X20, "5. Row / Column Spacing.  ", /X30, "*"
            TYPE "*", /X20, "6. Minimum Parts.         ", /X30, "*"
            TYPE "*", /X20, "7. Reference Locations.   ", /X30, "*"
            TYPE "*", /X20, "8. Quit Menu.             ", /X30, "*"
            TYPE "*", /X75, "*"
            TYPE "*", /X15, "See Documentation for Further Clarification.", /X16, "*"
            TYPE "*", /X75, "*"
            FOR i = 1 TO 77
                TYPE "*", /S
            END
            TYPE /C0
            PROMPT "   Selection: ", $selection selection = VAL($selection)
```

```
ZGA3:[150013]PALLET.CFG;3          21-AUG-1990 10:34:55.33              10

CASE selection OF
              VALUE 1:
                CALL cfg.helpcfg()
              VALUE 2:
                CALL cfg.helploc()
              VALUE 3:
                CALL cfg.helparea()
              VALUE 4:
                CALL cfg.helptier()
              VALUE 5:
                CALL cfg.helpspace()
              VALUE 6:
                CALL cfg.helpminpart()
              VALUE 7:
                CALL cfg.helpref()
              VALUE 8:
                quit = TRUE
              ANY
                TYPE "Invalid Input. Try Again."
                TIMER (1) = 0
                WHILE TIMER(1) < delay DO
                END
            END
        UNTIL (quit == TRUE)
        TYPE /C3

.END
.PROGRAM cfg.helpminpart()
;;Authors: Marta Galuga, Jay Glaspy
;;Date: February 1, 1990
;;Revised by:Salena Pitts----------June 21, 1990
;;Requires: none.
;;Returns: none
;;Description:
;       This program types to the screen an explanation of MINIMUM PARTS.
;;Side Effects:
;       -types messages to screen.
;       -queries user for input.
;
;@Copywrite 1990, Xerox Corporation
;***********************************************************************
        TYPE /C24, /U23
        FOR i = 1 TO 77
            TYPE "*", /S
        END
        TYPE /C0
        TYPE "*", /X28, "Minimizing Parts", /X31, "*"
        FOR i = 1 TO 77
            TYPE "*", /S
        END
        TYPE /C0
        TYPE "*", /X75, "*"
        TYPE "*", /X10, "Minimum Parts for Any One Area -  this represents the fewest", /
        TYPE "*", /X10, "number of parts corresponding to any single area on the given",
        TYPE "*", /X10, "pallet.  Because the pallet is kitted, all other area part", /X7
        TYPE "*", /X10, "quantities are a multiple of, or equal to this number.  Also,",
        TYPE "*", /X10, "this number should equal the maximum of parts for at least", /X7
        TYPE "*", /X10, "one of the areas", /X49, "*"
        FOR i = 1 TO 77
            TYPE "*", /S
        END
        TYPE /C0
        PROMPT "Press <return> to continue: ", $key .END
.PROGRAM cfg.helpref()
```

```
ZGA3:[150013]PALLET.CFG;3            21-AUG-1990 10:34:55.33           11

;;Authors: Marta Galuga, Jay Glaspy
;;Date: February 1, 1990
;;Revised by: Salena Pitts---------June 21, 1990
;;Requires: none.
;;Returns: none
;;Description:
;       This program types to the screen an explanation of a REFERENCE
;       LOCATION.
;;Side Effects:
;       -types messages to screen.
;       -queries user for input.
;
;@Copywrite 1990, Xerox Corporation
;**********************************************************************

TYPE /C24, /U23
        FOR i = 1 TO 77
            TYPE "*", /S
        END
        TYPE /C0
        TYPE "*", /X29, "Reference Location", /X28, "*"
        FOR i = 1 TO 77
            TYPE "*", /S
        END
        TYPE /C0
        TYPE "*", /X75, "*"
        TYPE "*", /X10, "The origin of each pallet area is defined as row 1,", /X14, "*"
        TYPE "*", /X10, "column 1.  When facing the robot's workspace from behind", /X9
        TYPE "*", /X10, "the robot's base, this point is located at the bottom, right",
        TYPE "*", /X10, "corner of each area.", /X45, "*"
        TYPE "*", /X75, "*"
        FOR i = 1 TO 77
            TYPE "*", /S
        END
        TYPE /C0
        PROMPT "Press <return> to continue: ", $key .END
.PROGRAM cfg.helpspace()
;;Authors: Marta Galuga, Jay Glaspy
;;Date: February 1, 1990
;;Revised by: Salena Pitts----------June 21, 1990
;;Requires: none.
;;Returns: none
;;Description:
;       This program types to the screen an explanation of a ROW and COLUMN
;       SPACING.
;;Side Effects:
;       -types messages to screen.
;       -queries user for input.
;
;@Copywrite 1990, Xerox Corporation
;**********************************************************************

AUTO $key

TYPE /C24, /U23
        FOR i = 1 TO 77
            TYPE "*", /S
        END
        TYPE /C0
        TYPE "*", /X29, "Row & Column Spacing", /X26, "*"
        FOR i = 1 TO 77
            TYPE "*", /S
        END
        TYPE /C0
        TYPE "*", /X75, "*"
```

2GA3:[150013]PALLET.CFG;3          21-AUG-1990 10:34:55.33          12

```
        TYPE "*", /X7, "ROW - a pallet row is parallel to the robot's world y-axis.", /X9,
        TYPE "*", /X7, "COLUMN - a pallet column is parallel to robot's world x-axis.", /X
        TYPE "*", /X7, "ROW SPACING defines the distance (in millimeters) between parts",
        TYPE "*", /X7, "in a pallet row, while COLUMN SPACING defines the distance", /X10,
        TYPE "*", /X7, "(in millimeters) between parts in a pallet column.", /X18, "*"
        TYPE "*", /X75, "*"
        FOR i = 1 TO 77
            TYPE "*", /S
        END
        TYPE /CO
        PROMPT "Press <return> to continue: ", $key
.END
.PROGRAM cfg.helptier()
;;Authors: Marta Galuga, Jay Glaspy
;;Date: February 1, 1990
;;Revised by: Salena Pitts--------June 21, 1990
;;Requires: none.
;;Returns: none
;;Description:
;       This program types to the screen an explanation of a TIER.
;;Side Effects:
;       -types messages to screen.
;       -queries user for input.
;
;@Copywrite 1990, Xerox Corporation
;****************************************************************

AUTO $key

TYPE /C24, /U23
        FOR i = 1 TO 77
            TYPE "*", /S
        END
        TYPE /CO
        TYPE "*", /X28, "Explanation of Tier", /X28, "*"
        FOR i = 1 TO 77
            TYPE "*", /S
        END
        TYPE /CO
        TYPE "*", /X75, "*"
        TYPE "*", /X14, "If a pallet has more than one level, it is considered", /X8, "*"
        TYPE "*", /X14, "multi-tiered.  Each area of the pallet will have one or", /X6, "*"
        TYPE "*", /X14, "more tiers.  If the tiers of an area ascend in the +x ", /X7, "*"
        TYPE "*", /X14, "direction the z height will be a negative value. Likewise,", /X3,
        TYPE "*", /X14, "if the tiers descend in the +x direction the z height will", /X3,
        TYPE "*", /X14, "be positive.", /X49, "*"
        TYPE "*", /X75, "*"
        FOR i = 1 TO 77
            TYPE "*", /S
        END
        TYPE /CO
        PROMPT "Press <return> to continue: ", $key
.END
.PROGRAM cfg.menu()
;;Authors: Marta Galuga, Jay Glaspy
;;Date: February 1, 1990
;;Revised by: Salena Pitts-----June 21, 1990
;;Requires: none.
;;Returns: none.
;;Description:
;       This program sets up a menu to allow the user to create and modify
;       PASIII pallet structures.
;       Operations include:
;          - Creating new pallet structures.
;          - Modifying existing pallet structures.
```

```
2GA3:[150013]PALLET.CFG;3           21-AUG-1990 10:34:55.33              13

;          - View existing pallet structures.
;          - Help (definitions, submenu item operation)
;;Side Effects:
;          - types messages to terminal screen.
;          - queries user for terminal input.
;
;@Copywrite 1990, Xerox Corporation
;*********************************************************************

AUTO i, selection, $selection, delay, quit

REACTE cfg.errhandler

CALL p.init("")
        delay = 2
        quit = FALSE
        DO
            TYPE /C24, /U23
            FOR i = 1 TO 77
                TYPE "*", /S
            END
            TYPE /C0
            TYPE "*", /X24, "PALLET CONFIGURATION PROGRAM", /X23, "*"
            FOR i = 1 TO 77
                TYPE "*", /S
            END
            TYPE /C0
            TYPE "*", /X75, "*"
            TYPE "*", /X20, "1. Configure New Pallets.", /X30, "*"
            TYPE "*", /X20, "2. Reconfigure Pallets.  ", /X30, "*"
            TYPE "*", /X20, "3. View Configuration.   ", /X30, "*"
            TYPE "*", /X20, "4. Help.                 ", /X30, "*"
            TYPE "*", /X20, "5. Draw Pallet.          ", /X30, "*"
            TYPE "*", /X20, "6. Quit Menu.            ", /X30, "*"
            TYPE "*", /X75, "*"
            TYPE "*", /X15, "See Documentation for Further Clarification.", /X16, "*"
            TYPE "*", /X75, "*"
            FOR i = 1 TO 77
                TYPE "*", /S
            END
            TYPE /C0
            PROMPT "    Selection: ", $selection selection = VAL($selection)
            CASE selection OF
              VALUE 1:
                CALL cfg.newpallet()
              VALUE 2:
                CALL cfg.reconfig()
              VALUE 3:
                CALL cfg.view()
              VALUE 4:
                CALL cfg.helpmenu()
              VALUE 5:
                CALL cfg.drawpal()
              VALUE 6:
                quit = TRUE
              ANY
                TYPE "Invalid Input. Try Again."
                TIMER (1) = 0
                WHILE TIMER(1) < delay DO
                END
            END
        UNTIL (quit == TRUE)
        TYPE /C3

.END
```

ZGA3:[150013]PALLET.CFG;3          21-AUG-1990 10:34:55.33                    14

```
.PROGRAM cfg.modifyarea(ploc, area)
;;Authors: Marta Galuga, Jay Glaspy
;;Date: February 1, 1990
;;
;;Requires:
;       -Integer: ploc,area
;;Returns: none.
;;Description:
;       This function checks to see if the given pallet location (ploc) with
;       area (area) is defined. If it is it will allow modifications to be made
;       to the various characteristics of the area (ie., number of rows,
;       columns, tiers, etc.).
;;Side Effects:
;       - modifies pallet.config[,,] in memory.
;       - types messages to the terminal and/or waits for input.
;
;@Copywrite 1990, Xerox Corporation
;**********************************************************************

AUTO maxrows, maxcols, maxtiers, maxparts, zoffset
        AUTO xoffset, yoffset, epsilon, $name
        AUTO zoffset, mfactor, $ans IF DEFINED(pallet.config[ploc,area,]) THEN
            TYPE "Current values are inside square brackets. <Return> to leave"
            TYPE "value unchanged, or input new value."

;get current values of structure.
            maxrows = pallet.config[ploc,area,c.maxrows]
            maxcols = pallet.config[ploc,area,c.maxcols]
            maxtiers = pallet.config[ploc,area,c.maxtiers]
            maxparts = pallet.config[ploc,area,c.maxparts]
            zoffset = pallet.config[ploc,area,c.zoffset]
            xoffset = pallet.config[ploc,area,c.xoffset]
            yoffset = pallet.config[ploc,area,c.yoffset]
            epsilon = pallet.config[ploc,area,c.epsilon]
            $name = $pallet.partname[ploc,area]
            mfactor = pallet.config[ploc,area,c.mfactor]
            TYPE /X10, "PART NAME:[", $name, "]", /S
            PROMPT "", $ans
            IF $ans <> "" THEN
                $name = $ans
            END
            TYPE /X10, "MAXIMUM ROWS:[", maxrows, "]", /S
            PROMPT "", $ans
            IF $ans <> "" THEN
                maxrows = VAL($ans)
            END
            TYPE /X10, "MAXIMUM COLUMNS:[", maxcols, "]", /S
            PROMPT "", $ans
            IF $ans <> "" THEN
                maxcols = VAL($ans)
            END
            TYPE /X10, "MAXIMUM TIERS:[", maxtiers, "]", /S
            PROMPT "", $ans
            IF $ans <> "" THEN
                maxtiers = VAL($ans)
                TYPE /X10, "TIER Z-OFFSET:[", zoffset, "]", /S
                PROMPT "", $ans
                IF $ans <> "" THEN
                    zoffset = VAL($ans)
                END
            END
            TYPE /X10, "MAXIMUM PARTS:[", maxparts, "]", /S
            PROMPT "", $ans
            IF $ans <> "" THEN
                maxparts = VAL($ans)
            END
```

ZGA3:[150013]PALLET.CFG;3                 21-AUG-1990 10:34:55.33                    15

```
            TYPE /X10, "ROW SPACING:[", xoffset, "]", /S
            PROMPT "", $ans
            IF $ans <> "" THEN
                xoffset = VAL($ans)
            END
            TYPE /X10, "COLUMN SPACING:[", yoffset, "]", /S
            PROMPT "", $ans
            IF $ans <> "" THEN
                yoffset = VAL($ans)
            END
            TYPE /X10, "FRAME ERROR:[", epsilon, "]", /S
            PROMPT "", $ans
            IF $ans <> "" THEN
                epsilon = VAL($ans)
            END
            TYPE /X10, "PART QUANTITY OF SMALLEST AREA PALLET ", ploc, ":[", INT(maxpar
            PROMPT "", $ans
            IF $ans <> "" THEN
                mfactor = INT(maxparts/VAL($ans))
            END
        ;save all values (modified or not) of structure.
            pallet.config[ploc,area,c.maxrows] = maxrows
            pallet.config[ploc,area,c.maxcols] = maxcols
            pallet.config[ploc,area,c.maxtiers] = maxtiers
            pallet.config[ploc,area,c.maxparts] = maxparts
            pallet.config[ploc,area,c.zoffset] = zoffset
            pallet.config[ploc,area,c.xoffset] = xoffset
            pallet.config[ploc,area,yoffset] = yoffset
            pallet.config[ploc,area,c.epsilon] = epsilon
            $pallet.partname[ploc,area] = $name
            pallet.config[ploc,area,c.mfactor] = mfactor
            TYPE "Remember to 'store 'nameval.v2' before clearing memory."
            TYPE
            TYPE "For assistance with this operation, please reference the"
            TYPE "Pallet Configuration Menu Module of the FAS Applications"
            TYPE "User Manual."

ELSE
            TYPE "AREA NOT DEFINED."
        END

.END
.PROGRAM cfg.newpallet()
;;Authors: Marta Galuga, Jay Glaspy
;;Date: February 1, 1990
;;Revised by: Salena Pitts------June 21, 1990
;;Requires: none.
;;Returns: none.
;;Description:
;       This program allows the user to create a new FAS pallet structure.
;       After the completion of defining all pallet locations used in the
;       assembly process, the user is informed to save the changes in a
;       file called 'nameval.v2' using the monitor command 'STORE'.
;;Side Effects:
;       - pallet.config[,,] created as a global variable.
;       - type messages to the screen and/or waits for user input.
;
;@Copywrite 1990, Xerox Corporation
;****************************************************************

AUTO pnum, ans, $ans, pcount, ploc, acount, anum, lcm, response, parts
        AUTO tool.parts
        AUTO LOC ref tool.parts = FALSE TYPE /C24, /U23
        TYPE "*****************CONFIGURING NEW PALLET STRUCTURE*****************"
```

```
ZGA3:[150013]PALLET.CFG;3        21-AUG-1990 10:34:55.33           16

TYPE /C3
        TYPE "CAUTION: If you intend to teach a frame, proper tooling for"
        TYPE "         application use must be attached to robot before proceeding. "
        TYPE
        TYPE " Will a Tooling Pallet be used for this Application [y/n]? ", /S
        response = GETC(4)
        IF (response == ASC("y")) OR (response == ASC("Y")) THEN
            CALL p.setactive(c.pallet.h, TRUE)
            TYPE /C1
            TYPE " Are There Parts Located on the Tooling Pallet [y/n]? ", /S
            parts = GETC(4)
            IF (parts == ASC("y")) OR (parts == ASC("Y")) THEN
                tool.parts = TRUE
            END END
        TYPE /C1
        PROMPT " How many other Pallets will you be using? ", $ans IF tool.parts == TRUE THEN
            ans = VAL($ans)
            ans = ans+1
        ELSE
            ans = VAL($ans)
        END TYPE
        TYPE "************************Configure Pallets************************."
        IF tool.parts == TRUE THEN
            TYPE
            TYPE " Configure The Part Areas on the Tooling Pallet the Same Way"
            TYPE " You Configure the Part Areas on any of the Other Pallets"
        END IF (ans > 0) AND (ans < 11) THEN
            pnum = ans
            pcount = 1
            DO  ;configure pallets
                $str = " Input Location of Pallet Number "+$ENCODE(pcount)+" (h for Hel
                CALL cfg.getans($str, "cfg.helploc", ploc)
                TYPE "PALLET LOCATION ", ploc, ":"
                TYPE /X5, /S
                $str = " How Many Areas Are On Pallet? (h for Help): "
                CALL cfg.getans($str, "cfg.helparea", ans)
                anum = ans
                acount = 1
                ;least common multiple of parts for all areas
                $str = " Least Amount of Parts in One Area (h for Help): "
                CALL cfg.getans($str, "cfg.helpminpart", lcm)
                DO  ;configure areas
                    TYPE /X5
                    TYPE "LOCATION ", pcount, ", AREA ", acount, ":"
                ;initialize part counter
                    CALL p.setfield(ploc, acount, c.partqty, 0)
                ;initialize epsilon offset
                    CALL p.setfield(ploc, acount, c.epsilon, 0)
                ;set row and column counters
                    CALL p.setrow(ploc, acount, 1, 1)
                ;max rows
                    $str = " How Many Rows in Area? (h for Help): "
                    CALL cfg.getans($str, "cfg.helpspace", ans)
                    CALL p.setfield(ploc, acount, c.maxrows, ans)
                ;max columns
                    $str = " How Many Columns in Area? (h for Help): "
                    CALL cfg.getans($str, "cfg.helpspace", ans)
                    CALL p.setfield(ploc, acount, c.maxcols, ans)
                ;max tiers
                    $str = " How Many Tiers in Area? (h for Help): "
```

ZGA3:[150013]PALLET.CFG;3            21-AUG-1990 10:34:55.33                    17

```
                CALL cfg.getans($str, "cfg.helptier", ans)
                CALL p.setfield(ploc, acount, c.maxtiers, ans)
                IF ans > 1 THEN
                    $str = " Input Tier z-offset (h for Help): "
                    CALL cfg.getans($str, "cfg.helptier", ans)
                    CALL p.setfield(ploc, acount, c.zoffset, ans)
                ELSE
                    CALL p.setfield(ploc, acount, c.zoffset, 0)
                    CALL p.setfield(ploc, acount, c.maxtiers, 1)
                END
                TYPE /X10, /S
            ;part name
                PROMPT " Part Name: ", $pallet.partname[ploc,acount]
                TYPE /X10, /S
            ;max parts
                PROMPT " Total Number of Parts: ", ans
                CALL p.setfield(ploc, acount, c.maxparts, ans)
            ;mfactor
                CALL p.setfield(ploc, acount, c.mfactor, INT(ans/lcm))
            ;x offset
                $str = " Row Spacing [millimeters] (h for Help): "
                CALL cfg.getans($str, "cfg.helpspace", ans)
                CALL p.setfield(ploc, acount, c.xoffset, ans)
            ;y offset
                $str = " Column Spacing [millimeters] (h for Help): "
                CALL cfg.getans($str, "cfg.helpspace", ans)
                CALL p.setfield(ploc, acount, c.yoffset, ans)
                PROMPT " Would you like to Teach a Frame for This Area (y/n]? ", $a
                IF $ans == "y" THEN
                    CALL cfg.calcframe(ploc, acount)
                ELSE
                    $str = " Move robot to reference point and press <Return> (h f(
                    CALL cfg.getans($str, "cfg.helpref", ans)
                    HERE ref
                    CALL p.setref(ploc, acount, ref)
                END
                acount = acount+1
            UNTIL (acount > anum)
            CALL p.setactive(ploc, TRUE)
            pcount = pcount+1
        UNTIL (pcount > pnum)
    ELSE
        TYPE " Number of Pallet Locations is Out of Range."
        TIMER 1 = 0
        WAIT TIMER(1) > delay
    END .END
.PROGRAM cfg.reconfig()
;;Authors: Marta Galuga, Jay Glaspy
;;Date: February 1, 1990
;;Revised by: Salena Pitts------June 21, 1990
;;Requires: none.
;;Returns: none.
;;Description:
;       This program sets up a menu that allows the user to modify
;       existing FAS pallet structures. The operations include:
;           - Delete pallet structure: remove a pallet location structure.
;           - Delete area structure: removes an area from a pallet structure.
;           - Modify structure: allows changes to be made to pallet structure.
;*** NOTE: this program assumes that the structure file 'nameval.v2') has
;          already been loaded.
;;Side Effects:
;       - types messages to screen.
;       - queries user for terminal input.
;       - modifies pallet.config[,,]
;
```

```
ZGA3:[150013]PALLET.CFG;3          21-AUG-1990 10:34:55.33              18

;@Copywrite 1990, Xerox Corporation
;****************************************************************
        AUTO i, $ans, ans, $d
        AUTO REAL ploc, area, cancel DO
            TYPE /C24, /U23
            FOR i = 1 TO 77
                TYPE "*", /S
            END
            TYPE /C0
            TYPE "*", /X24, "PALLET RECONFIGURATION PROGRAM", /X21, "*"
            FOR i = 1 TO 77
                TYPE "*", /S
            END
            TYPE /C0
            TYPE "*", /X75, "*"
            TYPE "*", /X24, "Note: to break out of a menu option anytime", /X8, "*"
            TYPE "*", /X24, "after the selection has already been confirmed", /X5, "*"
            TYPE "*", /X24, "type 'a' twice for abort.", /X26, "*"
            TYPE "*", /X75, "*"
            TYPE "*", /X24, "1. Modify Pallet Structure.", /X24, "*"
            TYPE "*", /X24, "2. Delete Pallet Structure.", /X24, "*"
            TYPE "*", /X24, "3. Reteach Frame.", /X34, "*"
            TYPE "*", /X24, "4. Delete Area Structure.", /X26, "*"
            TYPE "*", /X24, "5. Quit.", /X43, "*"
            TYPE "*", /X75, "*"
            FOR i = 1 TO 77
                TYPE "*", /S
            END TYPE /C1
            PROMPT "Enter Selection:  ", $ans
            ans = VAL($ans)
            IF ans <> 5 THEN
                CALL cfg.getpallet(ploc, cancel)
                IF NOT cancel THEN
                    CALL cfg.getarea(ploc, area, cancel)
                    IF NOT cancel THEN
                        CASE ans OF
                            VALUE 1:
                                CALL cfg.modifyarea(ploc, area)
                            VALUE 2:
                                PROMPT "Confirm Delete [y/n]? ", $ans
                                IF $ans == "y" THEN
                                    $realvar = "deleter pallet.config["+$ENCODE(ploc)+",,]"
                                    MCS $realvar
                                    TYPE "Pallet Structure ", ploc, " Deleted."
                                END
                            VALUE 3:
                                CALL cfg.calcframe(pallet.loc, area)
                            VALUE 4:
                                PROMPT "Confirm Delete [y/n]? ", $ans
                                IF $ans == "y" THEN
                                    $realvar = "deleter pallet.config["+$ENCODE(ploc)+","+$
                                    MCS $realvar
                                    TYPE "Area ", area, " on Pallet ", ploc, " Deleted."
                                END
                            VALUE 5:
                                quit = TRUE
                            ANY
                                TYPE "Illegal Selection."
                        END ;end case
                    ELSE
                        TYPE "Operation Cancelled."
                    END ;if not cancel on area
                ELSE
```

```
                    TYPE "Operation Cancelled."
                END      ;if not cancel on pallet
                PROMPT "Press <Return to Continue...>", $d
            END   ; end if ans<>quit
        UNTIL (ans == 5)

.END
.PROGRAM cfg.view()
;;Authors: Marta Galuga, Jay Glaspy
;;Date: February 1, 1990
;;Revised by: Salena Pitts------June 21, 1990
;;Requires: none.
;;Returns: none.
;;Description:
;       This program allows the user to view an existing pallet structure.
;       It builds a list of the available pallets and areas within the
;       structure and gives the user a choice from this list of what to view.
;;Side Effects:
;       - types messages to the screen and/or waits for user input.
;
;@Copywrite 1990, Xerox Corporation
;***********************************************************************

AUTO $ans, ans, pallets[11], x, i
        AUTO REAL maxrows, maxcols, maxtiers, maxparts, epsilon, f
        AUTO xoffset, yoffset, zoffset, $name, quit DO
            TYPE /C24, /U23
            FOR i = 1 TO 77
                TYPE "*", /S
            END
            TYPE /C0
            TYPE "*", /X24, "VIEW PALLET STRUCTURE       ", /X23, "*"
            FOR i = 1 TO 77
                TYPE "*", /S
            END
            TYPE /C1
            x = 1
            FOR i = 1 TO 10
                IF DEFINED(pallet.config[i,,]) THEN
                    TYPE x, "- PALLET LOCATION ", i, "."
                    pallets[x] = i
                    x = x+1
                END
            END
            TYPE x, "- QUIT."
            quit = x
            TYPE "Enter Selection For the Pallet to View: ", /S
            PROMPT "", $ans
            ans = VAL($ans)
            IF (ans > 0) AND (ans <> quit) THEN
                ploc = pallets[ans]
                x = 1
                FOR i = 1 TO 10
                    IF DEFINED(pallet.config[ploc,i,]) THEN
                        TYPE x, "- AREA ", i, "."
                        area[x] = i
                        x = x+1
                    END
                END
                TYPE "Enter Selection For the Area to View : "
                PROMPT "", $ans
                area = area[VAL($ans)]
                IF DEFINED(pallet.config[ploc,area,]) THEN
                ;get current values.
                    maxrows = pallet.config[ploc,area,c.maxrows]
                    maxcols = pallet.config[ploc,area,c.maxcols]
```

ZGA3:[150013]PALLET.CFG;3          21-AUG-1990 10:34:55.33          20

```
                maxtiers = pallet.config[ploc,area,c.maxtiers]
                maxparts = pallet.config[ploc,area,c.maxparts]
                zoffset = pallet.config[ploc,area,c.zoffset]
                xoffset = pallet.config[ploc,area,c.xoffset]
                yoffset = pallet.config[ploc,area,c.yoffset]
                epsilon = pallet.config[ploc,area,c.epsilon]
                $name = $pallet.partname[ploc,area]

FOR i = 1 TO 77
                    TYPE "*", /S
                END
                TYPE /C0
                TYPE "* PALLET LOCATION ", ploc, " AREA ", area, ":", /X47, "*"
                TYPE "*", /X75, "*"
                f = 11-LEN($name)
                TYPE "* PART NAME: ", $name, /S
                FOR i = 1 TO f
                    TYPE " ", /S
                END
                TYPE /X15, "ROW SPACING:", /I4, yoffset, /X21, "*"
                TYPE "* MAXIMUM ROWS:", /I4, maxrows, /X20, "COLUMN SPACING:", /I
                TYPE "* MAXIMUM COLUMNS:", /I4, maxcols, /X17, "TIER OFFSET:", /I
                TYPE "* MAXIMUM TIERS:", /I4, maxtiers, /X19, "FRAME ERROR:", /G6
                TYPE "* MAXIMUM PARTS:", /I4, maxparts, /X56, "*"

FOR i = 1 TO 77
                    TYPE "*", /S
                END
                TYPE /C1
            ELSE
                TYPE "NO AREA SELECTED."
            END
            PROMPT "Press <Return> to Continue...", d
        ELSE
            IF ans <> quit THEN
                TYPE "NO PALLET SELECTED."
            END
        END
    UNTIL ans == quit

.END
```

We claim:

1. A flexible, workpiece assembly system for automatically performing operations on a plurality of similar workpieces located on a pallet, comprising:

a workcell for performing operations to modify at least one of said plurality of similar workpieces present on the pallet;

a cell controller in communication with said workcell, for controlling the operation of said workcell in response to a set of preprogrammed requirements;

means, located at said workcell, for detecting a defect in the assembly of the plurality of similar workpieces and generating an error message indicative of the defect, the error message including a first signal identifying, by location on the pallet, one of the plurality of workpieces detected as having a defect and a second signal, associated with said first signal, to indicate a nature of the defect detected therefor; and a bus for communicating the error message to said cell controller, so that said cell controller may initiate an appropriate response.

2. The system of claim 1, wherein said first signal includes:

an area designator identifying an area on the pallet that contains the defective workpiece;

a row designator identifying a row on the pallet in which the workpiece lies; and a column designator identifying a column on the pallet in which the workpiece lies.

3. The system of claim 1, wherein said cell controller includes a random access memory, and the system further includes means for storing a pallet ID, a workpiece location and a defect code for the defective workpiece in the cell controller memory, in response to said first and second signals, so as to prevent further use of the defective workpiece.

4. The system of claim 1, further including means, responsive to the error message, for identifying a defective workpiece and removing the defective workpiece from the pallet before further processing thereof.

5. The system of claim 1, further including means, responsive to said error message, for identifying a defective workpiece on the pallet so that the defective workpiece may be reworked before subsequent processing of the workpiece remaining on the pallet.

6. The system of claim 1, wherein the workcell comprises:

a robot controller; and a robot, responsive to signals generated by said robot controller, for performing mechanical assembly operations to modify a workpiece present on the pallet.

7. The system of claim 6, wherein said defect detecting means comprises a vision system, attached to said robot, for detecting the presence of a workpiece on the pallet.

8. The system of claim 6, wherein said defect detecting means comprises a force sensor, integrally connected to the robot, for determining whether the force necessary to accomplish the workpiece assembly is within a predefined range.

9. A method of controlling a flexible, workpiece assembly system having a workcell which includes a robot controller and a robot, responsive to the robot controller, for assembling a plurality of similar workpieces present on a pallet presented to the workcell, comprising the steps of:

defining locations for the plurality of workpieces on the pallet presented to the workcell;

in response to a set of preprogrammed requirements provided to a cell controller, communicating from the cell controller to the workcell a plurality of commands for controlling the operation of the workcell so as to assemble the workpieces on the pallet;

detecting, at the workcell, a defect during the assembly of one of the workpieces present on the pallet and generating an error message indicative of a location of the defective one of the workpieces and a nature of the defect; and communicating the error message to the cell controller over a bus.

10. The method of claim 9, further including the steps of:

determining whether the defect identified during assembly is a correctable defect; and if so automatically instituting an action to correct the defect; otherwise requesting, via the error message communicated to the cell controller, operator intervention to rectify the defect.

11. The method of claim 10, wherein the step of automatically instituting an action to correct the defect, includes the steps of:

generating commands to adjust the operating characteristics of the robot so as to avoid further defects during execution of the preprogrammed requirements; and recording the occurrence of a correctable defect so as to maintain a record of such defects, wherein the record further identifies the workpiece on which the defect was noted by recording a pallet ID, and a row and column in which the workpiece is located on the pallet.

12. The method of claim 9, further including the steps of:

determining whether the defect identified during assembly is a fatal defect which cannot be corrected by the robot;

if a fatal defect, indicating that operator intervention is required at the workcell; and recording, in memory, the presence of a defective workpiece on the pallet so as to maintain a record of such defects, wherein the record further identifies the workpiece on which the defect was noted by recording a pallet ID, and a row and column in which the workpiece is located.

13. The method of claim 9, further including the steps of:

determining whether the defect identified during assembly is a defect which cannot be corrected by the robot; and if so tagging the workpiece for which the defect was detected so as to identify the workpiece for subsequent correction of the defect.

14. The method of claim 13, wherein the step of tagging the workpiece includes:

generating, in a memory, a record which identifies the workpiece by recording a pallet ID for the pallet, and a row and column in which the workpiece is located thereon; and indicating, within the memory record, that the workpiece has been identified as defective.

15. The method of claim 9, further including the steps of:

recording, in response to the error message, the presence of a potentially defective workpiece on the pallet so as to maintain a record of such defects, wherein the error message provides sufficient data to produce a record which identifies the workpiece on which the defect was noted by recording a pallet ID, and a row and column in which the workpiece is located.

16. A method of controlling a flexible, workpiece assembly system having a workcell which includes a robot controller and a robot, responsive to the robot controller, for assembling the workpieces, comprising the steps of:

defining locations for a plurality of workpieces on a pallet presented to the workcell;

in response to a set of preprogrammed requirements provided to a cell controller, communicating from the cell controller to the workcell a plurality of commands for controlling the operation of the workcell so as to assemble the workpieces on the pallet;

detecting, at the workcell, a defect during the assembly of a workpiece on the pallet and generating an error message indicative of the defect;

communicating the error message to the cell controller;

determining whether the defect identified during assembly is a correctable defect, and if so automatically instituting an action to correct the defect by generating commands to adjust the operating characteristics of the robot so as to avoid further defects during execution of the preprogrammed requirements, and recording the occurrence of a correctable defect so as to maintain a record of such defects, wherein the record further identifies the workpiece on which the defect was noted by recording a pallet ID, and a pallet row and column location for the workpiece location, otherwise requesting, via the error message communicated to the cell controller, operator intervention to rectify the defect; tracking the total number of occurrences of correctable defects; and indicating that operator intervention is required when the number of occurrences of correctable defects exceeds a predefined threshold level.

17. A method of controlling a flexible, workpiece assembly system having a workcell which includes a robot controller and a robot, responsive to the robot controller, for assembling the workpieces, comprising the steps of:

(1) defining locations for a plurality of workpieces on a pallet presented to the workcell;

(2) in response to a set of preprogrammed requirements provided to a cell controller, communicating from the cell controller to the workcell a plurality of commands for controlling the operation of the workcell so as to assemble the workpieces on the pallet;

(3) detecting, at the workcell, a defect during the assembly of a workpiece on the pallet and generating an error message indicative of the defect;

(4) communicating the error message to the cell controller (5) interrogating the error message to determine if the error reported from the workcell is correctable; and if so (a) determining whether the correctable error may be corrected automatically or requires operator intervention, and if automatic correction is possible, (b) effectuating automatic correction of the reported error, otherwise (c) signaling an operator to manually adjust the robot; otherwise (6) determining whether the uncorrectable error is a fatal error; and if so (a) stopping the process and signaling for operator intervention before subsequent assembly operations are conducted at the workcell, otherwise (b) identifying the defective workpiece on the pallet so that the defective workpiece may be prevented from further assembly processing.

18. The method of claim 17, wherein the step of identifying the defective workpiece includes the steps of:

storing, in cell controller memory, process error data derived from the error message which comprises a pallet identifier, a workpiece location, and a defect code for each defective workpiece;

retrieving, from the cell controller memory, the process error data associated with a particular pallet identifier; and preventing, in response to the process error data retrieved, further use of the defective workpiece.

19. The method of claim 18, further including the step of removing defective workpieces identified by the process error data from the pallet.

20. The method of claim 18, further including the steps of:

retrieving the process error data for a particular pallet from the cell controller memory; and reworking the defective workpieces identified by the process error data before subsequent processing of the pallet.

21. The method of claim 20, further including the step of displaying, on a user-interface screen, a graphical illustration of the pallet and the location of defective workpieces thereon to visually facilitate the manual selection of the defective workpieces.

* * * * *